(12) United States Patent
Dallal et al.

(10) Patent No.: US 12,309,761 B2
(45) Date of Patent: *May 20, 2025

(54) REAL TIME CONTROL OF AN ELECTRONICALLY CONFIGURABLE DEFLECTOR

(71) Applicant: QUALCOMM Incorporated, San Diego, CA (US)

(72) Inventors: Yehonatan Dallal, Kfar Saba (IL); Ran Berliner, Kfar-Aviv (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 17/474,636

(22) Filed: Sep. 14, 2021

(65) Prior Publication Data

US 2022/0086820 A1 Mar. 17, 2022

Related U.S. Application Data

(60) Provisional application No. 63/079,162, filed on Sep. 16, 2020.

(51) Int. Cl.
*H04W 72/044* (2023.01)
*H04W 16/28* (2009.01)
(Continued)

(52) U.S. Cl.
CPC ......... *H04W 72/046* (2013.01); *H04W 16/28* (2013.01); *H04W 72/0446* (2013.01); *H04W 72/20* (2023.01)

(58) Field of Classification Search
CPC ............... H04W 72/046; H04W 72/20; H04W 72/0446; H04W 16/28
See application file for complete search history.

(56) References Cited

U.S. PATENT DOCUMENTS 6,496,157 B1 * 12/2002 Mottier ................. H01Q 1/246
342/373
11,483,037 B2 10/2022 Dallal et al.
(Continued)

FOREIGN PATENT DOCUMENTS

CN 101232319 A 7/2008
KR 102054777 B1 1/2020

OTHER PUBLICATIONS

He J., et al., "Adaptive Beamforming Design for mmWave RIS-Aided Joint Localization and Communication", 2020 IEEE Wireless Communications and Networking Conference Workshops (WCNCW), IEEE, Apr. 6, 2020 (Apr. 6, 2020), pp. 1-6, XP033784497, DOI: 10.1109/WCNCW48565.2020.9124848 [retrieved on Jun. 24, 2020] the whole document.

(Continued)

*Primary Examiner* — Jasper Kwoh
(74) *Attorney, Agent, or Firm* — Holland & Hart LLP

(57) ABSTRACT

Methods, systems, and devices for wireless communications are described. A base station may transmit control signaling including a beam shaping configuration to a channel engineering device. The channel engineering device may apply the beam shaping configuration during a time period in which the base station is communicating with a user equipment (UE). The beam shaping configuration may include one or more parameters that modify one or more deflection settings at the channel engineering device to adjust an electronic metamaterial of the channel engineering device to focus received signal energy, reflect received signal energy, refract received signal energy, filter received signal energy, or any combination thereof. The base station and one or more UEs may communicate using the channel engineering device based on the beam shaping configuration.

28 Claims, 18 Drawing Sheets

(51) Int. Cl.
*H04W 72/0446* (2023.01)
*H04W 72/20* (2023.01)

(56) References Cited

U.S. PATENT DOCUMENTS

| | | | | |
|---|---|---|---|---|
| 2007/0080891 | A1* | 4/2007 | De Lustrac | H01Q 3/46 |
| | | | | 343/909 |
| 2013/0300604 | A1* | 11/2013 | Lopez | H01Q 1/246 |
| | | | | 342/372 |
| 2015/0237609 | A1* | 8/2015 | Sun | H04B 17/345 |
| | | | | 370/329 |
| 2017/0251441 | A1* | 8/2017 | Axnäs | H04B 7/088 |
| 2018/0083363 | A1* | 3/2018 | Izadian | H01Q 19/10 |
| 2019/0158162 | A1 | 5/2019 | Ryu et al. | |
| 2020/0243951 | A1* | 7/2020 | Liu | H04W 16/28 |
| 2020/0280127 | A1 | 9/2020 | Hormis et al. | |

OTHER PUBLICATIONS

International Search Report and Written Opinion—PCT/US2021/050435—ISA/EPO—Dec. 21, 2021.

Zheng B., et al., "Intelligent Reflecting Surface-Enhanced OFDM: Channel Estimation and Reflection Optimization", IEEE Wireless Communications Letters, IEEE, Piscataway, NJ, USA, vol. 9, No. 4, Dec. 20, 2019 (Dec. 20, 2019), pp. 518-522, XP011782311, ISSN: 2162-2337, DOI: 10.1109/LWC.2019.2961357 [retrieved on Apr. 8, 2020] the whole document.

* cited by examiner

Control Signaling 305

Signal 310-a

Signal 310-b

REAL TIME CONTROL OF AN ELECTRONICALLY CONFIGURABLE DEFLECTOR

CROSS REFERENCE

The present Application for Patent claims the benefit of U.S. Provisional Patent Application No. 63/079,162 by DALLAL et al., entitled "REAL TIME CONTROL OF AN ELECTRONICALLY CONFIGURABLE DEFLECTOR," filed Sep. 16, 2020, assigned to the assignee hereof, and expressly incorporated by reference herein.

FIELD OF TECHNOLOGY

The following relates to wireless communications, including real time control of an electronically configurable deflector.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support real time control of an electronically configurable deflector. Generally, the described techniques provide a base station to transmit control signaling including a beam shaping configuration (e.g., indicating one or more deflection settings) to a channel engineering device. The channel engineering device may apply the beam shaping configuration during a time period in which the base station is communicating with a user equipment (UE). In some cases, the beam shaping configuration may include one or more parameters that modify the one or more deflection settings at the channel engineering device to adjust an electronic metamaterial of the channel engineering device to focus received signal energy, reflect received signal energy, refract received signal energy, filter received signal energy, or any combination thereof. In some cases, the base station and one or more UEs may communicate using the channel engineering device based on the beam shaping configuration, which may reduce power consumption, bandwidth, distance between the one or more UEs and the base station, and cost among other advantages (e.g., when compared with using a repeater).

A method of wireless communications at a channel engineering device is described. The method may include receiving, from a base station, first control signaling that indicates a first beam shaping configuration for the channel engineering device to perform beam shaping of signals transmitted from the base station to a user equipment and configuring the channel engineering device to beam shape received signal energy in accordance with the first beam shaping configuration.

An apparatus for wireless communications at a channel engineering device is described. The apparatus may include a processor, memory coupled with the processor, and instructions stored in the memory. The instructions may be executable by the processor to cause the apparatus to receive, from a base station, first control signaling that indicates a first beam shaping configuration for the channel engineering device to perform beam shaping of signals transmitted from the base station to a user equipment and configure the channel engineering device to beam shape received signal energy in accordance with the first beam shaping configuration.

Another apparatus for wireless communications at a channel engineering device is described. The apparatus may include means for receiving, from a base station, first control signaling that indicates a first beam shaping configuration for the channel engineering device to perform beam shaping of signals transmitted from the base station to a user equipment and configuring the channel engineering device to beam shape received signal energy in accordance with the first beam shaping configuration.

A non-transitory computer-readable medium storing code for wireless communications at a channel engineering device is described. The code may include instructions executable by a processor to receive, from a base station, first control signaling that indicates a first beam shaping configuration for the channel engineering device to perform beam shaping of signals transmitted from the base station to a user equipment and configure the channel engineering device to beam shape received signal energy in accordance with the first beam shaping configuration.

Some examples of the method, apparatuses, and non-transitory computer-readable medium described herein may further include operations, features, means, or instructions for receiving second control signaling that configures the channel engineering device with a set of beam shaping configurations and a respective index of a set of indexes corresponding to a respective beam shaping configuration of the set of beam shaping configurations, where the first control signaling indicates a first index of the set of indexes that corresponds to the first beam shaping configuration.

In some examples of the method, apparatuses, and non-transitory computer-readable medium described herein, receiving the first control signaling may include operations, features, means, or instructions for receiving the first control signaling that indicates a first time period in which to apply the first beam shaping configuration.

In some examples of the method, apparatuses, and non-transitory computer-readable medium described herein, receiving the first control signaling may include operations, features, means, or instructions for receiving the first control signaling that indicates a second time period in which to apply a second beam shaping configuration different from the first beam shaping configuration.

In some examples of the method, apparatuses, and non-transitory computer-readable medium described herein, receiving the first control signaling may include operations, features, means, or instructions for receiving the first control signaling that indicates a set of time periods corresponding to a set of beam shaping configurations, and applying a respective beam shaping configuration of the set of beam shaping configurations during a respective time period of the set of time periods based on the first control signaling.

In some examples of the method, apparatuses, and non-transitory computer-readable medium described herein, receiving the first control signaling may include operations, features, means, or instructions for receiving the first control signaling that indicates a second beam shaping configuration different from the first beam shaping configuration, and receiving a switching command indicating to switch between the first beam shaping configuration and the second beam shaping configuration.

In some examples of the method, apparatuses, and non-transitory computer-readable medium described herein, receiving the first control signaling may include operations, features, means, or instructions for receiving the first control signaling that indicates the first beam shaping configuration including a list of one or more beam shaping settings.

Some examples of the method, apparatuses, and non-transitory computer-readable medium described herein may further include operations, features, means, or instructions for receiving the first control signaling prior to a time period boundary between adjacent time periods, the time period boundary preceding a time period in which the first beam shaping configuration may be applied.

In some examples of the method, apparatuses, and non-transitory computer-readable medium described herein, the time period may be a slot, a symbol period, a mini-slot, a set of symbol periods, or a combination thereof.

In some examples of the method, apparatuses, and non-transitory computer-readable medium described herein, receiving the first control signaling may include operations, features, means, or instructions for receiving the first control signaling that indicates to apply the first beam shaping configuration until receiving second control signaling to apply a second beam shaping configuration different from the first beam shaping configuration.

In some examples of the method, apparatuses, and non-transitory computer-readable medium described herein, the first beam shaping configuration indicates one or more settings to adjust an electronic metamaterial of the channel engineering device to focus received signal energy, reflect received signal energy, refract received signal energy, filter received signal energy, or any combination thereof.

A method of wireless communications at a base station is described. The method may include transmitting first control signaling that indicates a first beam shaping configuration for a channel engineering device to perform beam shaping of signals transmitted from the base station to a user equipment and transmitting a signal to the channel engineering device based on the first control signaling.

An apparatus for wireless communications at a base station is described. The apparatus may include a processor, memory coupled with the processor, and instructions stored in the memory. The instructions may be executable by the processor to cause the apparatus to transmit first control signaling that indicates a first beam shaping configuration for a channel engineering device to perform beam shaping of signals transmitted from the base station to a user equipment and transmit a signal to the channel engineering device based on the first control signaling.

Another apparatus for wireless communications at a base station is described. The apparatus may include means for transmitting first control signaling that indicates a first beam shaping configuration for a channel engineering device to perform beam shaping of signals transmitted from the base station to a user equipment and transmitting a signal to the channel engineering device based on the first control signaling.

A non-transitory computer-readable medium storing code for wireless communications at a base station is described. The code may include instructions executable by a processor to transmit first control signaling that indicates a first beam shaping configuration for a channel engineering device to perform beam shaping of signals transmitted from the base station to a user equipment and transmit a signal to the channel engineering device based on the first control signaling.

Some examples of the method, apparatuses, and non-transitory computer-readable medium described herein may further include operations, features, means, or instructions for transmitting second control signaling that configures the channel engineering device with a set of beam shaping configurations and a respective index of a set of indexes corresponding to a respective beam shaping configuration of the set of beam shaping configurations, where the first control signaling indicates a first index of the set of indexes that corresponds to the first beam shaping configuration.

In some examples of the method, apparatuses, and non-transitory computer-readable medium described herein, transmitting the first control signaling may include operations, features, means, or instructions for transmitting the first control signaling that indicates a first time period in which to apply the first beam shaping configuration.

In some examples of the method, apparatuses, and non-transitory computer-readable medium described herein, transmitting the first control signaling may include operations, features, means, or instructions for transmitting the first control signaling that indicates a second time period in which to apply a second beam shaping configuration different from the first beam shaping configuration.

In some examples of the method, apparatuses, and non-transitory computer-readable medium described herein, transmitting the first control signaling may include operations, features, means, or instructions for transmitting the first control signaling that indicates a set of time periods corresponding to a set of beam shaping configurations.

In some examples of the method, apparatuses, and non-transitory computer-readable medium described herein, transmitting the first control signaling may include operations, features, means, or instructions for transmitting the first control signaling that indicates a second beam shaping configuration different from the first beam shaping configuration, and transmitting, to the channel engineering device, a switching command indicating to switch between the first beam shaping configuration and the second beam shaping configuration.

In some examples of the method, apparatuses, and non-transitory computer-readable medium described herein, receiving the first control signaling may include operations, features, means, or instructions for updating a list of one or more beam shaping settings corresponding to the first beam shaping configuration, and transmitting, to the channel engineering device, the first control signaling that indicates the list of one or more beam shaping settings.

Some examples of the method, apparatuses, and non-transitory computer-readable medium described herein may further include operations, features, means, or instructions for transmitting the first control signaling prior to a time period boundary between adjacent time periods, the time period boundary preceding a time period in which the first beam shaping configuration may be applied.

In some examples of the method, apparatuses, and non-transitory computer-readable medium described herein, the time period may be a slot, a symbol period, a mini-slot, a set of symbol periods, or a combination thereof.

In some examples of the method, apparatuses, and non-transitory computer-readable medium described herein, transmitting the first control signaling may include operations, features, means, or instructions for transmitting the first control signaling that indicates to apply the first beam shaping configuration until receiving second control signaling to apply a second beam shaping configuration different from the first beam shaping configuration.

In some examples of the method, apparatuses, and non-transitory computer-readable medium described herein, the first beam shaping configuration indicates one or more settings to adjust an electronic metamaterial of the channel engineering device to focus received signal energy, reflect received signal energy, refract received signal energy, filter received signal energy, or any combination thereof.

DETAILED DESCRIPTION

Figure 1:
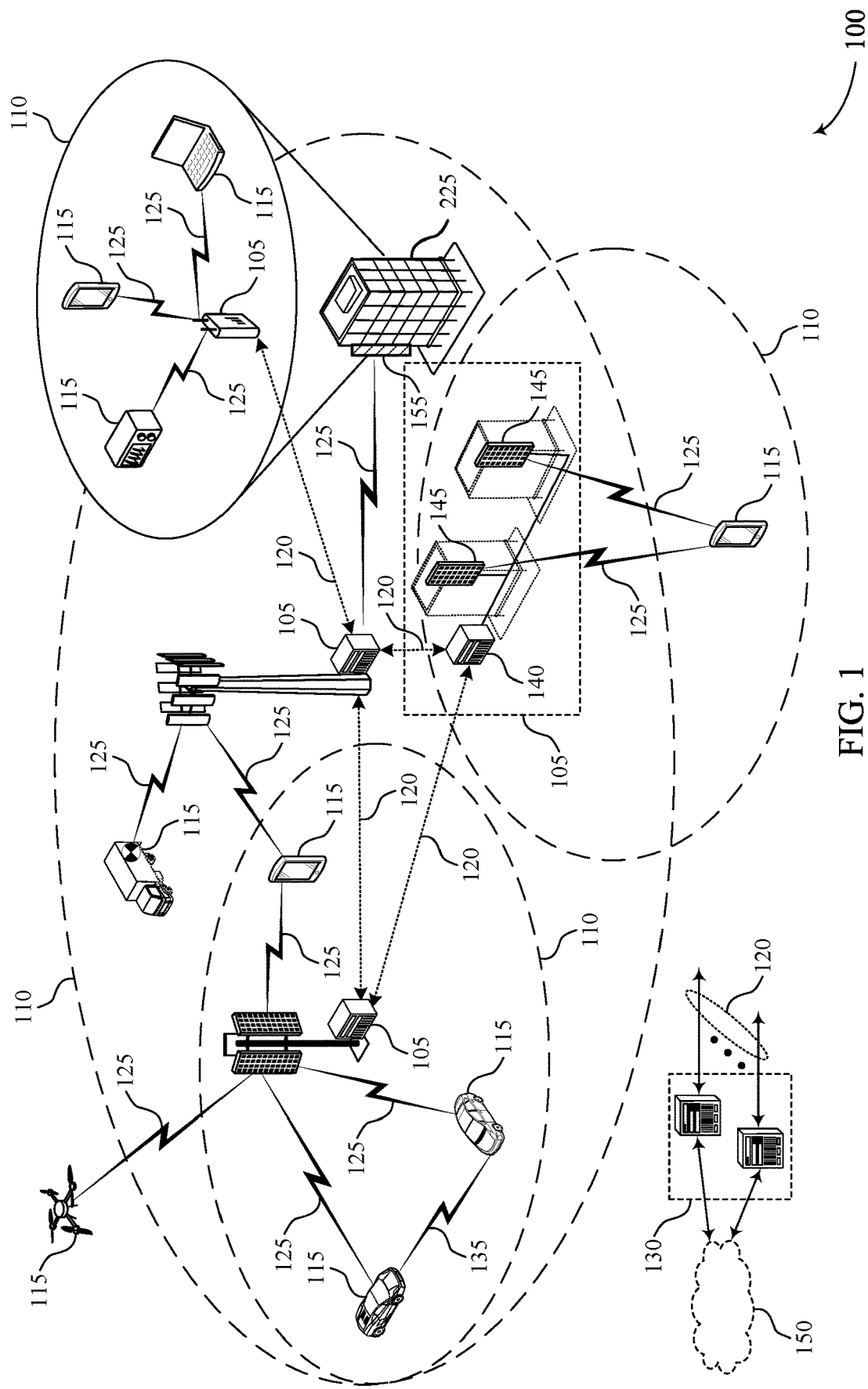
FIGS. 1 through 3 illustrate examples of wireless communications systems in accordance with aspects of the present disclosure.

In some examples, a user equipment (UE) may communicate control signaling, data, or both with a base station using a directional beam. For example, the UE and the base station may transmit a message across a beam path using the directional beam. However, an obstacle may block the beam path. In some cases, the message may not reach the destination because an object, such as a building, may block the beam path. In some examples, coverage is limited to line of sight (LOS) and specular reflections. In some cases, the base station or the UE may transmit the message to a repeater in an attempt to bypass the blockage. The repeater may receive the message from the UE and the base station and redirect the message towards a destination using a transmitter. In some examples, the repeater may incur a relatively high power consumption when redirecting the message (e.g., due to receiving the message, decoding the message, retransmitting the message, or a combination thereof). In some cases, the repeater may include a power amplifier that uses a power source.

To conserve power, a base station may configure a channel engineering device that uses a low power electronic metamaterial to direct received signal energy from a transmitter toward a receiver. Unlike traditional repeaters, channel engineering device may be passive and may not include a power amplifier (PA). The channel engineering device may have nominal (e.g., minimal) power constraints or requirements and may consume power at reconfiguration (e.g., consumes power when a signal deflection direction is reconfigured). In some examples, the channel engineering device may be solar powered, battery operated, or the like. The channel engineering device may be inexpensive and implemented as a simple printed circuit board that may be of a desired size (e.g., may be made very large). The channel engineering device may improve UE separation by beamforming from closer-by and may be flat permitting inclusion with a building's architecture. Signaling to configure the channel engineering device may consume relatively low bandwidth (e.g., very low bandwidth). Moreover, channel engineering device deflection settings may be determined using uplink (e.g., Uu) based angle of arrival (AoA) measurement procedures, and the Uu interface is inexpensive and available.

The channel engineering device may include specular reflectors, refractors, or both, to extend coverage to areas which are otherwise not covered. Both reflectors and refractors can also have a focusing, or energy concentration, effect to further enhance a communication link. In some cases, the base station may configure the metamaterial at the channel engineering device to direct signal energy in a desired direction. For example, the metamaterial may affect electromagnetic waves that interact with the structural features of the metamaterial. In an example, an electromagnetic metamaterial may affect electromagnetic waves that impinge on or interact with its structural features, which are smaller than a wavelength of the electromagnetic waves. In some examples, to behave as a homogeneous material accurately described by an effective refractive index, the structure features of the metamaterial may be much smaller than the wavelength. In an example, the metamaterial may include a grid of unit cells as the structural features, where each unit cell includes a tunable split ring resonator (SRR) and each unit cell is smaller than the wavelength (e.g., Unit Cell$<<\lambda$). The channel engineering device may apply a beam shaping configuration based on receiving a control message from the base station that indicates one or more deflection settings to tune some or all of the SRRs to modify the effective refractive index of the metamaterial.

The electronically controllable metamaterial consumes a small amount of power to set the direction in which to deflect, or focus, received signal energy, but may not use power when directing signal energy (e.g., there is no decoding and retransmitting). That is, the channel engineering device may introduce a new class of network elements with one or more deflection settings that may be determined using network based measurement procedures (e.g., triggered by the base station). The one or more deflection settings may control how one or more unit cells interact with one or more electromagnetic waves of a received signal to deflect the one or more electromagnetic waves of the received signal in a desired manner (e.g., reflect or refract toward a receiver). Thus, the channel engineering device consumes less power as compared to a repeater that receives a signal and subsequently retransmits the signal.

The base station may transmit control signaling including a beam shaping configuration to the channel engineering device. In some cases, the beam shaping configuration may be based on one or more AoA measurements for reference signals from UEs, the base station, or both. The channel engineering device may apply the beam shaping configuration until instructed to change to a different beam shaping configuration or for a defined time period. For example, the channel engineering device may maintain a beam shaping configuration until the base station signals an updated channel engineering device configuration, which may be referred to as a sticky approach.

In some cases, the control signaling from the base station may specify a time period, such as a slot, a symbol period, a mini-slot, multiple symbol periods, or a combination thereof, in which the channel engineering device is to apply a beam shaping configuration. In some cases, the control signaling from the base station may specify a set of beam shaping configurations and a set of time periods, and instruct the channel engineering device to apply a respective beam shaping configuration in a respective time period. In some cases, the beam shaping configuration may indicate a set of settings the channel engineering device is to apply. In some cases, the base station may configure the channel engineering device with multiple different sets of beam shaping settings, and the control signaling may indicate which set of beam shaping settings the channel engineering device is to apply (e.g., during a particular time period).

Aspects of the disclosure are initially described in the context of wireless communications systems to provide real time control of a configurable channel engineering device that may include a deflector, reflector, refractor, or any combination thereof, in millimeter wave and higher frequency bands. Aspects of the disclosure are further described in the context of a process flows. Aspects of the disclosure are further illustrated by and described with reference to apparatus diagrams, system diagrams, and flowcharts.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may communicate with one or more UEs 115 in a coverage area 110 using one or more directional beams. An obstacle 225, such as a building, may prevent a signal from reaching a destination via LOS transmission. In some examples, the base station 105 may configure a channel engineering device 155 with a beam shaping configuration for modifying a directional beam used by the base station 105, the one or more UEs, or a combination thereof, for communicating. For example, the channel engineering device 155 may receive control signaling that triggers the channel engineering device 155 to perform an angular measurement for one or more angular settings calculations. The base station 105 may perform the deflection (e.g., angular) settings calculation periodically for tracking the mobility of the one or more UEs 115. After performing the angular setting calculation, the base station 105 may configure the channel engineering device 155 with appropriate deflection parameters (e.g., reflection parameters) to be later applied in an operational mode.

In some cases, the base station 105 may transmit the deflection settings calculation to the channel engineering device 155 in control signaling. The deflection settings calculation may be included in a beam shaping configuration. In some cases, the beam shaping configuration may include one or more parameters that modify the one or more deflection settings at the channel engineering device 155 to adjust an electronic metamaterial of the channel engineering device 155 to focus received signal energy, reflect received signal energy, refract received signal energy, filter received signal energy, or any combination thereof. In some cases, the base station 105 and the one or more UEs may communicate using the channel engineering device 155 based on the beam shaping configuration, which may reduce power consumption, bandwidth, distance between the one or more UEs 115 and the base station 105, and cost among other advantages (e.g., when compared with using a repeater).

In some cases, the base station 105 may transmit control signaling including a beam shaping configuration to the channel engineering device 155. The channel engineering device 155 may perform a configuration switching operation for a new beam shaping configuration. The channel engineering device 155 may apply one or more settings received from the base station 105 in the control signaling to direct received signal energy from a signal transmission in accordance with the one or more deflection settings, such as toward a UE 115 for downlink transmission or toward base station 105 for uplink transmissions. In some cases, the base station 105 may update the channel engineering device settings for the channel engineering device 155 to be switched according to a different beam shaping configuration per time period. The base station 105 may use a sticky approach in which the channel engineering device 155 maintains the last setting until reconfigured by the base station 105. In some cases, the channel engineering device 155 may apply a beam shaping configuration during a time period for a signal transmission to or from a UE 115 based on the control signaling.

Figure 2:
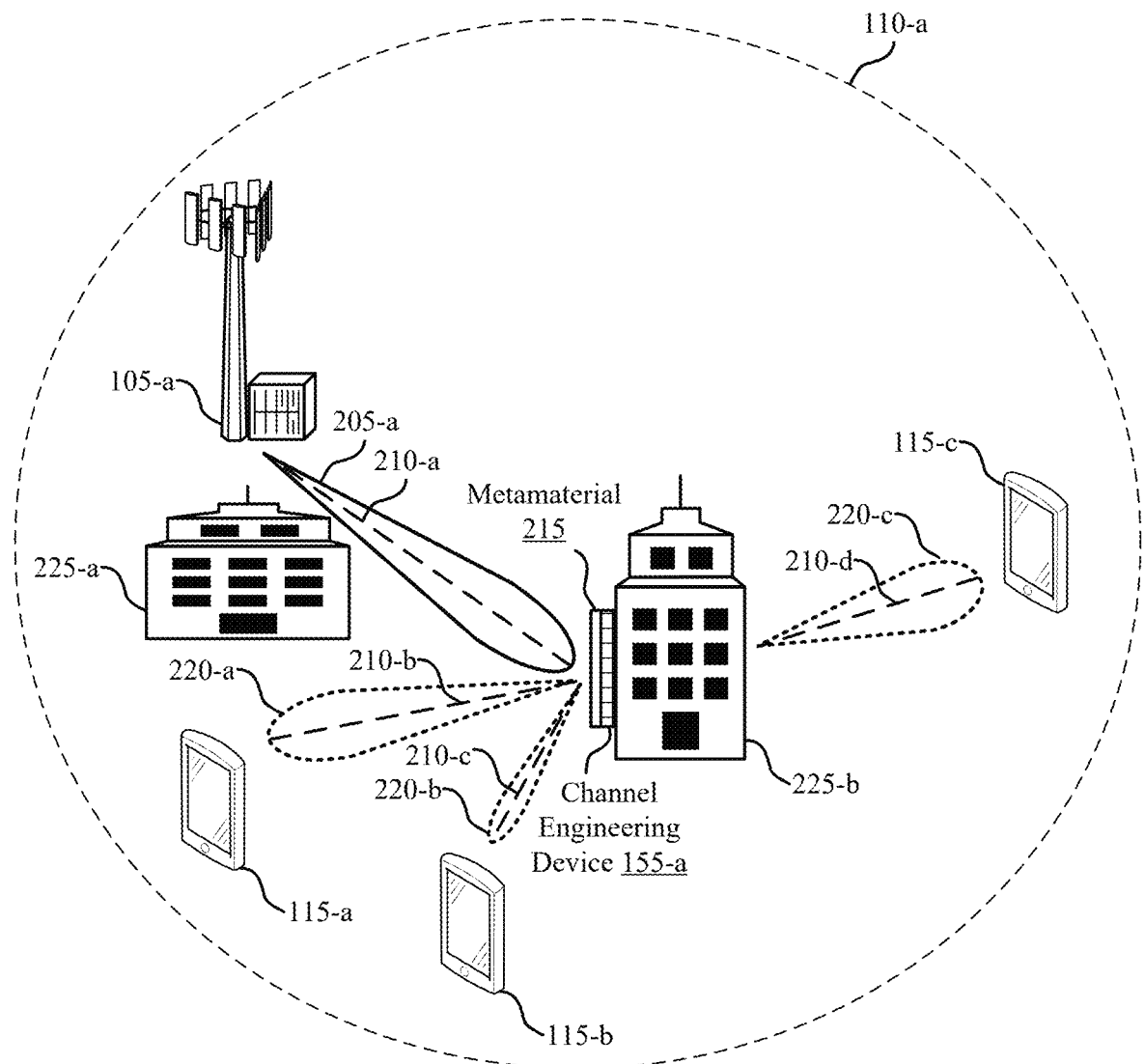

FIG. 2 illustrates an example of a wireless communications system 200 in accordance with aspects of the present disclosure. In some examples, wireless communications system 200 may implement aspects of wireless communications system 100 and may include UE 115-a through UE 115-c, base station 105-a with coverage area 110-a, and channel engineering device 155-a, which may be examples of UEs 115, a base station 105 with a coverage area 110, and a channel engineering device 155 as described with reference to FIG. 1. In some examples, channel engineering device 155-a may be configured with, or otherwise support, a beam shaping configuration for communications between base station 105-a and one or more UEs 115 (e.g., UE 115-a through UE 115-c). For example, UE 115-a through UE 115-c and base station 105-a may communicate control information, data, or both using one or more directional beams 205. Channel engineering device 155-a may modify a received signal energy of a directional beam 205 to form a modified directional beam 220 based on the beam shaping configuration.

In some cases, a base station 105 may communicate with a UE 115 using a directional beam 205 with a directional beam path 210. For example, base station 105-a may communicate with a UE 115 using directional beam 205-a with directional beam path 210-a. However, in some cases, there may be an obstacle 225 between the base station 105 and the UE 115. That is, base station 105-a may be unable to communicate with UEs 115 that do not satisfy a LOS condition. In some cases, an obstacle 225 may prevent LOS communication between base station 105-a and one or more of UE 115-a, UE 115-b, UE 115-c, or a combination thereof. For example, obstacle 225-a may prevent LOS communication between base station 105-a and UE 115-a, UE 115-b, or both. Obstacle 225-b may prevent LOS communication between base station 105-a and UE 115-c. Thus, it may be beneficial for base station 105-a to configure channel engineering device 155-a to extend the coverage area 110-a. In some cases, base station 105-a may communicate with one or more UEs 115 based on configuring channel engineering device 155-a with a beam shaping configuration, which is described in further detail with respect to FIG. 3.

In some examples, a channel engineering device 155 may include a metamaterial 215 and a base station 105 may configure one or more deflection settings of the channel engineering device 155. The channel engineering device may apply the one or more deflection settings to electronically control in which direction the metamaterial 215 directs received signal energy. For example, the metamaterial 215 may focus received signal energy (e.g., focusing refraction), reflect received signal energy, refract received signal energy, filter received signal energy, or any combination to enhance a communication link between the base station 105 and the UE 115. In some cases, the metamaterial 215 may affect electromagnetic waves that interact with its structural features, which may be smaller than the wavelength. In some examples, base station 105-a may configure channel engineering device 155-a to reflect signal energy from directional beam path 210-a to form a modified directional beam 220-a pointed along directional beam path 210-b toward UE 115-a, or to form a modified directional beam 220-b pointed along directional beam path 210-c toward UE 115-b, or both. In some other examples, base station 105-a may configure channel engineering device 155-a to refract signal energy from directional beam path 210-a to form a modified directional beam 220-c pointed along directional beam path 210-d toward UE 115-c. Additionally or alternatively, base station 105-a may configure channel engineering device 155-a to focus signal energy or filter signal energy from directional beam 205-a (e.g., along directional beam path 210-b through directional beam path 210-d). In some cases, the base station 105-a may configure channel engineering device 155-a to form modified directional beams 220-a, 220-b, and 220-c simultaneously or in different time periods. Base station 105-a may communicate with UE 115-a, UE 115-b, UE 115-c, or a combination thereof, using directional beam 205-a and modified directional beams 220-a, 220-b, and 220-c, respectively based on the beam shaping configuration.

Figure 3:
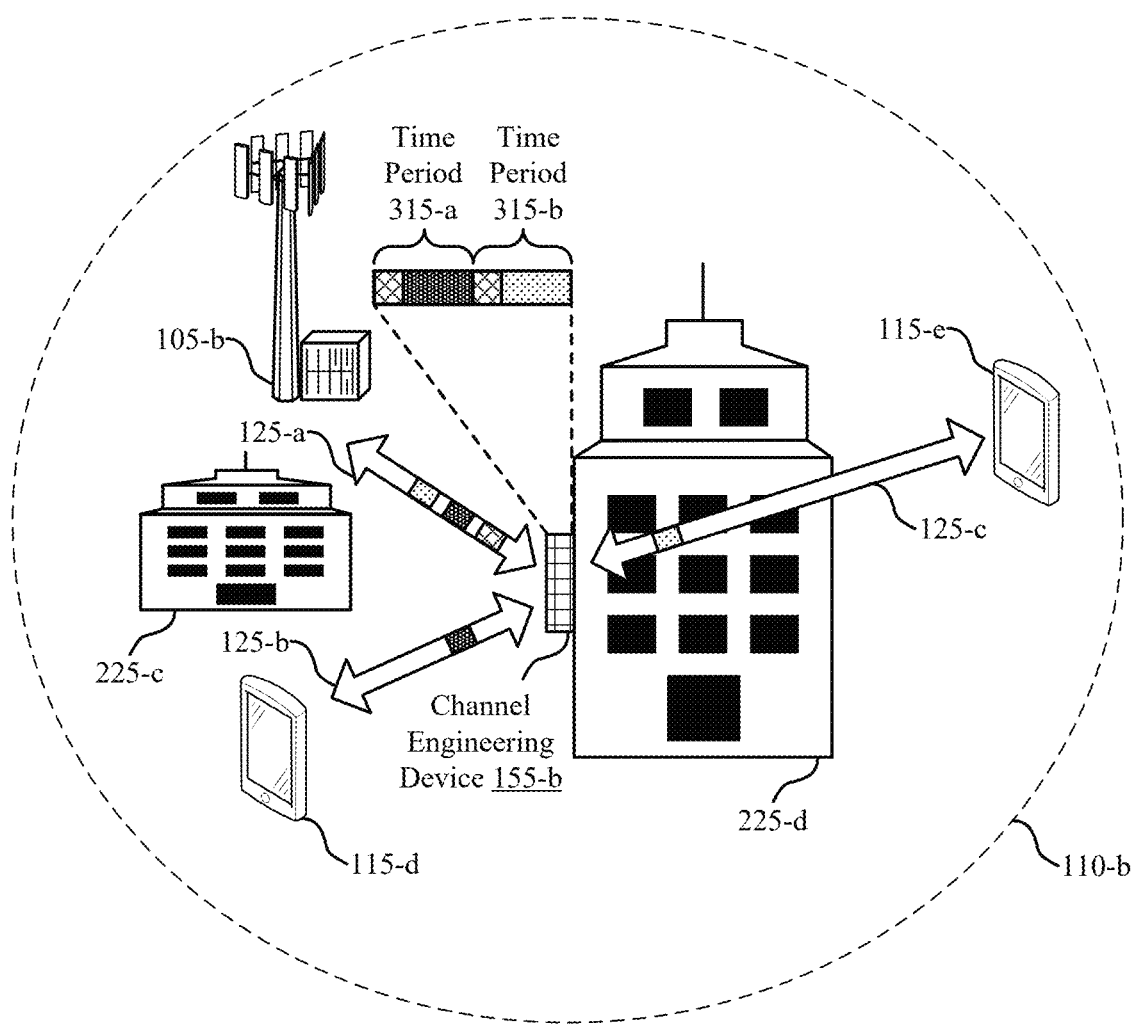
Figure 3:
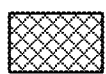
Figure 3:
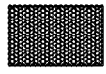
Figure 3:

FIG. 3 illustrates an example of a wireless communications system 300 in accordance with aspects of the present disclosure. In some examples, wireless communications system 300 may implement aspects of wireless communications system 100, wireless communications system 200, or both. Wireless communications system 300 may include UE 115-d, UE 115-e, communication links 125-a through 125-c, base station 105-b with coverage area 110-b, obstacle 225-c, obstacle 225-d, and channel engineering device 155-b, which may be examples of UEs 115, communication links 125, a base station 105 with a coverage area 110, obstacles 225, and a channel engineering device 155 as described with reference to FIGS. 1 and 2. In some examples, base station 105-b and UE 115-d, UE 115-e, or both may communicate using the channel engineering device 155-b, which may be configured with, or otherwise support, a beam shaping configuration.

In some cases, a base station 105 may communicate with one or more UEs 115 in a coverage area 110 using one or more directional beams. As described with reference to FIG. 2, an obstacle 225, such as a building, may prevent a signal from reaching a destination via LOS transmission. For example, obstacle 225-c may present a blockage for a signal trying to reach UE 115-d via LOS transmission. Similarly, obstacle 225-d may prevent a signal from reaching UE 115-e via LOS transmission. In some examples, base station 105-b may configure channel engineering device 155-b with a beam shaping configuration for modifying a directional beam used by base station 105-b, UE 115-d, UE 115-e, or a combination thereof, for communicating. For example, channel engineering device 155-b may receive control signaling 305 that triggers channel engineering device 155-b to perform an angular measurement for one or more angular settings calculations. Base station 105-b may perform the deflection (e.g., angular) settings calculation periodically for tracking the mobility of UE 115-d, UE 115-e, or both.

In some cases, base station 105-b may transmit the deflection settings calculation to channel engineering device 155-b in control signaling 305 via communication link 125-a. The deflection settings calculation may be included in a beam shaping configuration. In some cases, the beam shaping configuration may include one or more parameters that modify the one or more deflection settings at channel engineering device 155-b to adjust an electronic metamaterial of channel engineering device 155-b to focus received signal energy, reflect received signal energy, refract received signal energy, filter received signal energy, or any combination thereof. In some cases, base station 105-b, UE 115-d, and UE 115-e, may communicate using channel engineering device 155-b based on the beam shaping configuration, which may reduce power consumption, bandwidth, distance between the UE 115 and the base station 105, and cost among other advantages (e.g., when compared with using a repeater).

For example, channel engineering device 155-b may reflect a received signal energy for a signal transmission 310-a from base station 105-b to UE 115-d, or vice-versa, along communication link 125-a and communication link 125-b. In some other examples, channel engineering device 155-b may refract a received signal energy for a signal transmission 310-b from base station 105-b to UE 115-e, or vice-versa, along communication link 125-a and communication link 125-c. Additionally or alternatively, channel engineering device 155-b may filter or focus received signal energy for communications along communication link 125-a through communication link 125-c, which may enhance the quality of the communication link 125.

In some cases, base station 105-b may transmit a control signaling 305 indicating the beam shaping configuration to configure one or more deflection settings stored in a channel engineering device database of the channel engineering device 155-b. For example, base station 105-b may transmit the control message as radio resource control (RRC) signaling to update one or more deflection settings in the channel engineering device database of the channel engineering device 155-b. For example, base station 105-b may transmit control signaling (e.g., RRC reconfiguration command) to configure the channel engineering device 155-b to maintain a channel engineering device setting list (e.g., a setting list per UE) where each setting list stored by the channel engineering device 155-b is assigned a setting list index that is different from indexes assigned to other setting lists. The channel engineering device setting list may resemble transmission configuration indicator (TCI) table maintenance, CSI-RS resource list maintenance or any other RRC based list maintenance). The base station 105-b may transmit a control message including a particular setting list index to indicate which setting list the channel engineering device 155-b is to apply or switch to (e.g., for a particular time period or until instructed to switch). The control message may be a low footprint physical signal that carries the settings index and may be transmitted to instruct the channel engineering device 155-b to perform switching. In an example, the channel engineering device 155-b may store multiple channel engineering device setting lists in a table, and the received setting list index may be used to index the table to determine which setting list the channel engineering device 155-b is to apply. Channel engineering device 155-b may apply the one or more settings loaded in the channel engineering device database to direct received signal energy in accordance with the one or more deflection settings, such as toward a UE 115-f for downlink transmission or toward base station 105-c for uplink transmissions.

In some cases, base station 105-b may store the channel engineering device setting list locally (e.g., at base station 105-b). For example, channel engineering device 155-b may perform a configuration switching operation for a switching command using an explicit signal, such as a settings command using a physical downlink shared channel (PDSCH) from base station 105-b (e.g., included in control signaling 305). The switching command may indicate one or more deflection parameters that the channel engineering device 155-b is to apply. Channel engineering device 155-b may apply the one or more settings received from base station 105-b to direct received signal energy from a signal transmission 310 in accordance with the one or more deflection settings, such as toward a UE 115-f for downlink transmission or toward base station 105-c for uplink transmissions.

In some cases, base station 105-b may signal the channel engineering device settings for channel engineering device 155-b to be switched according to a different beam shaping configuration per time period. For example, the time period may be a slot and the base station 105-b may transmit control signaling to indicate which one or more settings the channel engineering device 155-b is to apply on a slot by slot basis. Base station 105-b may configure the channel engineering device 155-b to use a sticky approach in which channel engineering device 155-b maintains the last setting until reconfigured by base station 105-b, or the channel engineering device 155-b may be preconfigured to maintains the last setting until reconfigured. The channel engineering device switching command may be conveyed by a physical signal or a data channel (e.g., PDSCH). In some cases, channel engineering device 155-b may apply a beam shaping configuration during time period 315-a for signal transmission 310-a to or from UE 115-d based on the control signaling 305. Channel engineering device 155-b may apply a different beam shaping configuration during time period 315-b for signal transmission 310-b to or from UE 115-e based on control signaling 305. In some cases, the base station 105-b may transmit control signaling that includes a switching command conveyed by a physical signal (e.g., low footprint physical signal) or a data channel (e.g., a 5G NR data channel).

Figure 4:
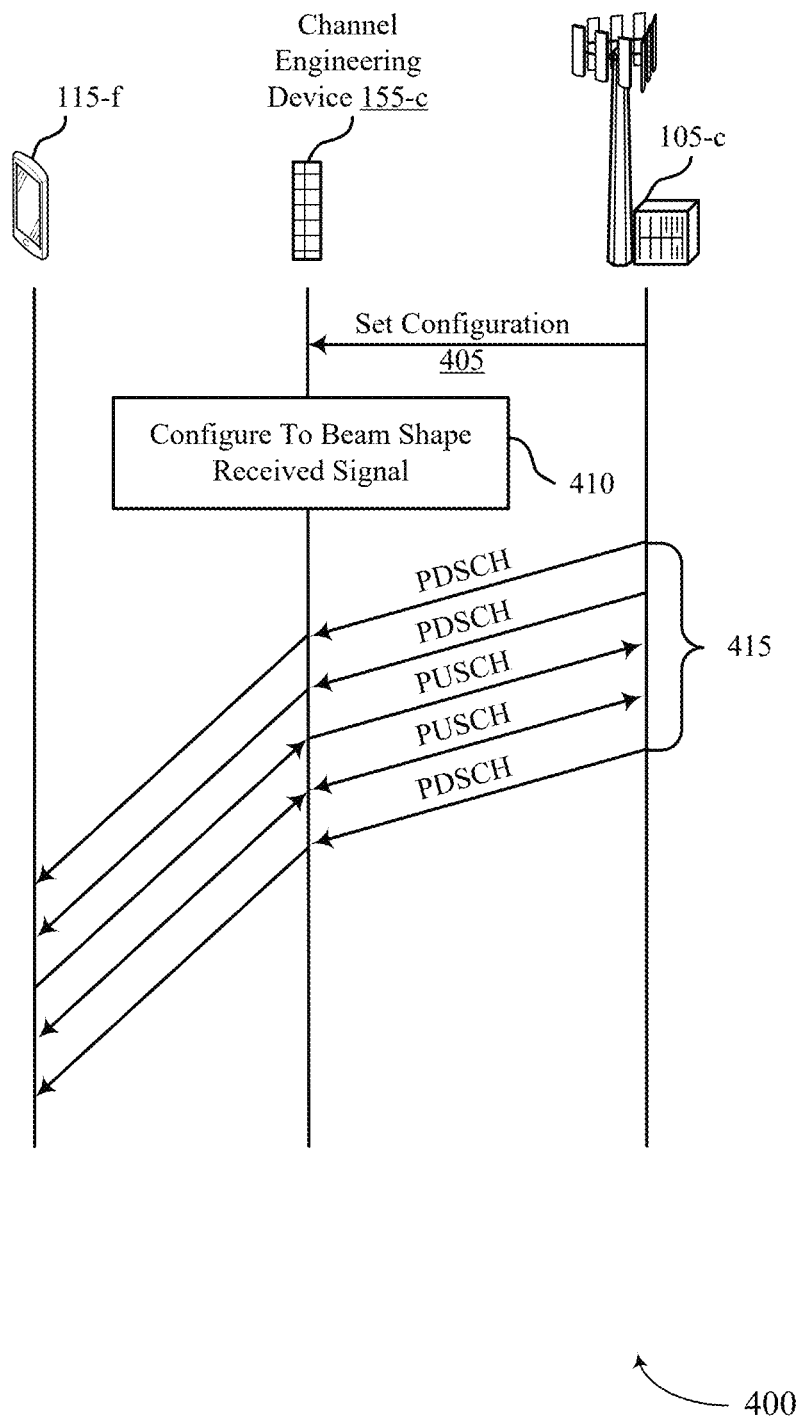
FIGS. 4 through 6 illustrate examples of process flows in accordance with aspects of the present disclosure.

FIG. 4 illustrates an example of a process flow 400 in accordance with aspects of the present disclosure. In some examples, process flow 400 may implement aspects of wireless communications system 100, wireless communications system 200, wireless communications system 300, or a combination thereof. The process flow 400 may illustrate an example of a base station 105 configuring a channel engineering device 155 with a beam shaping configuration for communicating with a UE 115. Alternative examples of the following may be implemented, where some processes are performed in a different order than described or are not performed. In some cases, processes may include additional features not mentioned below, or further processes may be added.

At 405, base station 105-c may transmit a beam shaping configuration to configure the channel engineering device 155-c with one or more deflection settings. The beam shaping configuration may indicate one or more settings to apply for each time period (e.g., slot) based on a UE 115, or group of UEs 115, base station 105-c is communicating with during that time period. The beam shaping configuration may set or modify one or more channel engineering device settings. In some cases, the channel engineering device 155-c may maintain the last setting until reconfigured with one or more updated deflection settings. In some examples, the beam shaping configuration may be transmitted prior to the scheduled time period boundary (e.g., prior to a boundary between adjacent slots), which may provide channel engineering device 155-c time to decode the message including the beam shaping configuration and adjust one or more deflection settings as indicated in the beam shaping configuration.

At 410, channel engineering device 155-c may apply one or more deflection settings indicated in the beam shaping configuration for beam shaping a received signal toward a UE 115 (e.g., UE 115-f) or from the UE 115 toward the base station 105-c. In some cases, channel engineering device 155-c may switch between applying one or more deflection settings at each time period boundary, which may be indicated at 405 (e.g., to change a direction in which signal energy is deflected in each time period). The time period may be a slot, a symbol, a mini-slot, special slot, or a combination thereof.

At 415, base station 105-c and UE 115-f may communicate on one or more channels using channel engineering device 155-c over a set of time periods, and the channel engineering device 155-c may deflect each received signal according to the beam shaping configuration in a respective time period. Base station 105-c may transmit one or more messages to UE 115-f on a downlink shared channel (e.g., a physical downlink shared channel (PDSCH). Additionally or alternatively, base station 105-c and UE 115-f may communicate one or more message on an uplink shared channel (e.g., a physical uplink shared channel (PUSCH)). In the depicted example, the channel engineering device 155-c deflects signal energy of downlink transmissions by the base station 105-c toward the UE 115-f, and deflects signal energy of uplink transmissions from UE 115-f toward the base station 105-c.

Figure 5:
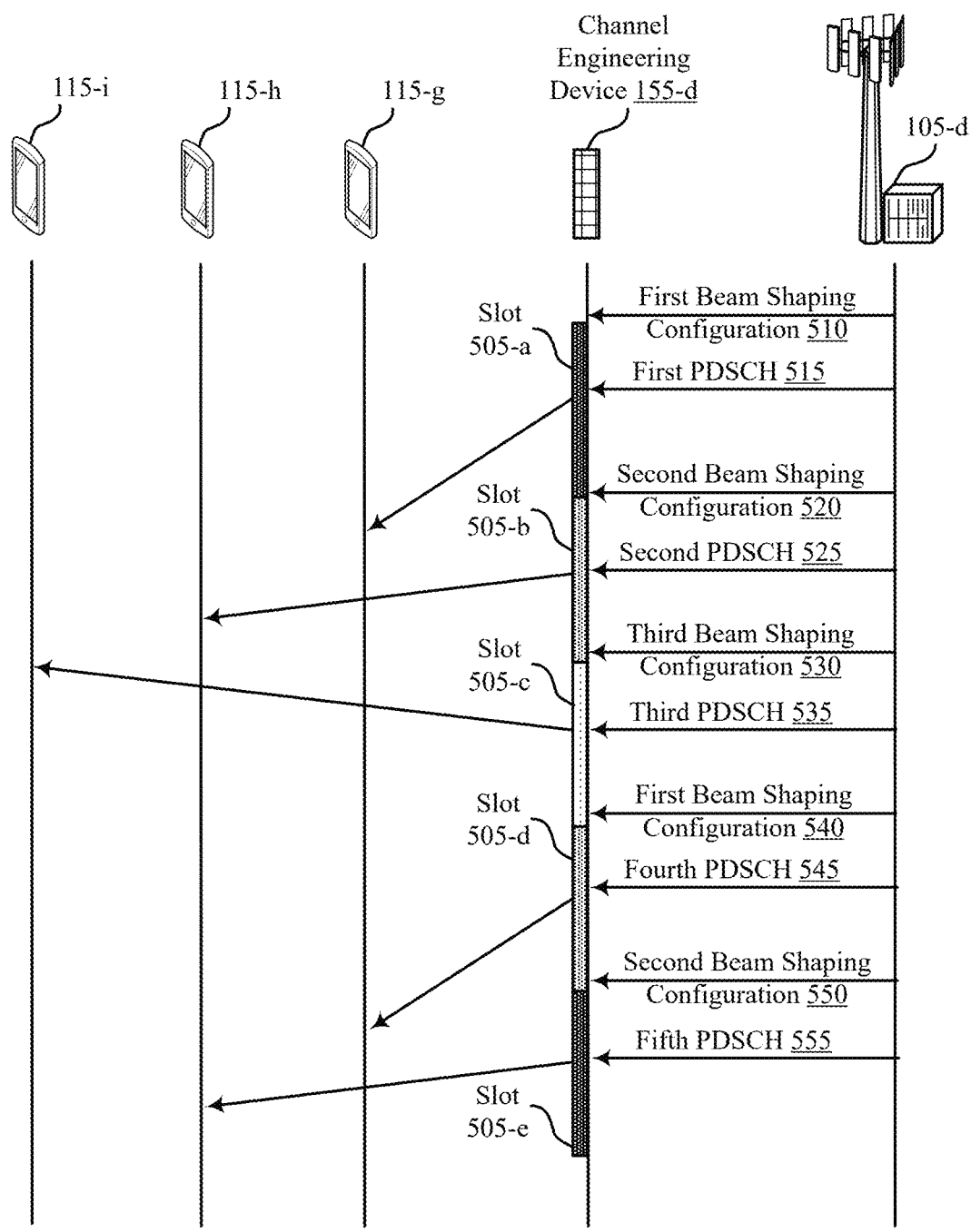

FIG. 5 illustrates an example of a process flow 500 in accordance with aspects of the present disclosure. In some examples, process flow 500 may implement aspects of wireless communications system 100, wireless communications system 200, wireless communications system 300, or a combination thereof. The process flow 500 may illustrate an example of a base station 105 configuring a channel engineering device 155 with a beam shaping configuration for communicating with multiple UEs 115. Alternative examples of the following may be implemented, where some processes are performed in a different order than described or are not performed. In some cases, processes may include additional features not mentioned below, or further processes may be added.

At 510, base station 105-d may transmit control signaling that includes a first beam shaping configuration for channel engineering device 155-d to apply for deflecting received signal energy toward UE 115-g. The configuration may include an indication of a first beam shaping configuration for each time period base station 105-d is communicating with UE 115-g, such as slot 505-a, 505-b, 505-c, and slot 505-d. The beam shaping configuration may modify one or more channel engineering device settings (e.g., beam shaping settings) to control how signal energy is deflected during a particular slot. In some cases, channel engineering device 155-d may maintain the last setting until reconfigured by base station 105-d. In some examples, the beam shaping configuration may be transmitted prior to the scheduled time period boundary (e.g., a boundary between two slots 505 adjacent in time), which may provide channel engineering device 155-d time to decode the message including the beam shaping configuration and modifying one or more deflection settings in accordance with the beam shaping configuration.

At 515, channel engineering device 155-d may apply the beam shaping configuration during a first time period, such as slot 505-a, for deflecting signal energy of a downlink transmission by base station 105-d toward UE 115-g. For example, base station 105-d may communicate signaling with UE 115-g using channel engineering device 155-d. Channel engineering device 155-d may apply the beam shaping configuration to the signaling. In some cases, the signaling may be on a PDSCH (e.g., a first PDSCH), PUSCH, or both.

At 520, base station 105-d may transmit second control signaling to channel engineering device 155-d to configure channel engineering device 155-d for deflecting signal energy of a downlink transmission by base station 105-d toward UE 115-g during a second time period, such as slot 505-b or during slot 505-e. The second control signaling may include an indication of a second beam shaping configuration, which may be different than the first beam shaping configuration for communication with UE 115-g.

At 525, channel engineering device 155-d may apply the second beam shaping configuration during slot 505-b based on receiving the second beam shaping configuration at 520. For example, base station 105-d may communicate a downlink transmission (e.g., a PDSCH transmission) that the channel engineering device 155-d deflects toward UE 115-h using. Channel engineering device 155-d may apply the second beam shaping configuration to the signaling. In some cases, the signaling may be on a PDSCH (e.g., a second PDSCH), PUSCH, or both. As seen in FIG. 4, the second PDSCH transmission may be deflected at a different angle than the first PDSCH transmission, as the UE 115-g and UE 115-h may be at different geographic locations.

At 530, base station 105-d may transmit third control signaling to channel engineering device 155-d to configure channel engineering device 155-d to deflect a downlink transmission toward UE 115-i during a third time period, such as slot 505-*c*. The third control signaling may include an indication of third beam shaping configuration, which may be different than the first beam shaping configuration for communication with UE 115-*g* and the second beam shaping configuration for communication with UE 115-*h*.

At 535, channel engineering device 155-*d* may apply the third beam shaping configuration during the third time period based on receiving the third beam shaping configuration at 530. For example, base station 105-*d* may transmit a third PDSCH transmission that the channel engineering device 155-*d* deflects toward UE 115-*i*. Channel engineering device 155-*d* may apply the third beam shaping configuration to the signaling. In some cases, the signaling may be on a PDSCH (e.g., a third PDSCH), PUSCH, or both.

At 540, base station 105-*d* may transmit fourth control signaling to channel engineering device 155-*d* to configure channel engineering device 155-*d* to deflect signal energy toward UE 115-*g* during a fourth time period, such as slot 505-*d*. The fourth control signaling may include an indication of the first beam shaping configuration for communicating with UE 115-*g*. In some cases, the fourth control signaling may include a fourth beam shaping configuration different from the first beam shaping configuration if UE 115-*g* has moved, channel engineering device 155-*d* is configured to perform periodic angular measurements, or both. At 545, channel engineering device 155-*d* may apply the first beam shaping configuration during the fourth time period based on receiving the first beam shaping configuration at 540. For example, base station 105-*d* may communicate a fourth PDSCH transmission that the channel engineering device 155-*d* deflect toward UE 115-*g*. Channel engineering device 155-*d* may apply the first beam shaping configuration to the signaling. In some cases, the signaling may be on the PDSCH (e.g., the first PDSCH from 515), the PUSCH, or both.

At 550, base station 105-*d* may transmit fifth control signaling to channel engineering device 155-*d* to configure channel engineering device 155-*d* to deflect signal energy toward UE 115-*h* during a fifth time period, such as slot 505-*e*. The fifth control signaling may include an indication of the second beam shaping configuration for communicating with UE 115-*h*. In some cases, the fifth control signaling may include a fifth beam shaping configuration different from the second beam shaping configuration if UE 115-*h* has moved, channel engineering device 155-*d* is configured to perform periodic angular measurements, or both. At 555, channel engineering device 155-*d* may apply the second beam shaping configuration during the fifth time period based on receiving the second beam shaping configuration at 550. For example, base station 105-*d* may transmit a fifth PDSCH transmission that the channel engineering device 155-*d* deflects toward the UE 115-*h*. Channel engineering device 155-*d* may apply the first beam shaping configuration to the signaling. In some cases, the signaling may be on the PDSCH (e.g., the second PDSCH from 525), the PUSCH, or both.

In some examples, to reduce signaling overhead and increase power saving at channel engineering device 155-*d*, base station 105-*d* may communicate control signaling that includes a workplan for a number of time periods, or slots 505, ahead (e.g., N slots ahead). For example, base station 105-*d* may transmit control signaling that may configure channel engineering device 155-*d* with multiple beam shaping configurations and indicates in which time period to apply a respective configuration. Based on the workplan, the channel engineering device 155-*d* may apply the corresponding one or more deflection settings in a respective time period of the work plan (e.g., time periods or slots 505-*a* to 505-*e*) to deflect signal energy toward a particular one of UE 115-*g*, UE 115-*h*, or UE 115-*i*. Similar techniques may be applied for uplink transmissions by UE 115-*g*, UE 115-*h*, or UE 115-*i*, where the base station 105-*d* may configure the channel engineering device 155-*d* to apply a beam shaping configuration on a time period by time period basis, or using a work plan, to deflect signal energy of an uplink transmission from UE 115-*g*, UE 115-*h*, or UE 115-*i*, toward the base station 105-*d* in respective time periods. In the depicted example, switch of one or more deflection settings may occur at up to each slot boundary. Switching may occur at other time durations. For example, the switch may occur at symbol boundary (e.g., for mini slot scheduling), for special slots with different UEs being scheduled for downlink and uplink symbols, or the like.

Figure 6:
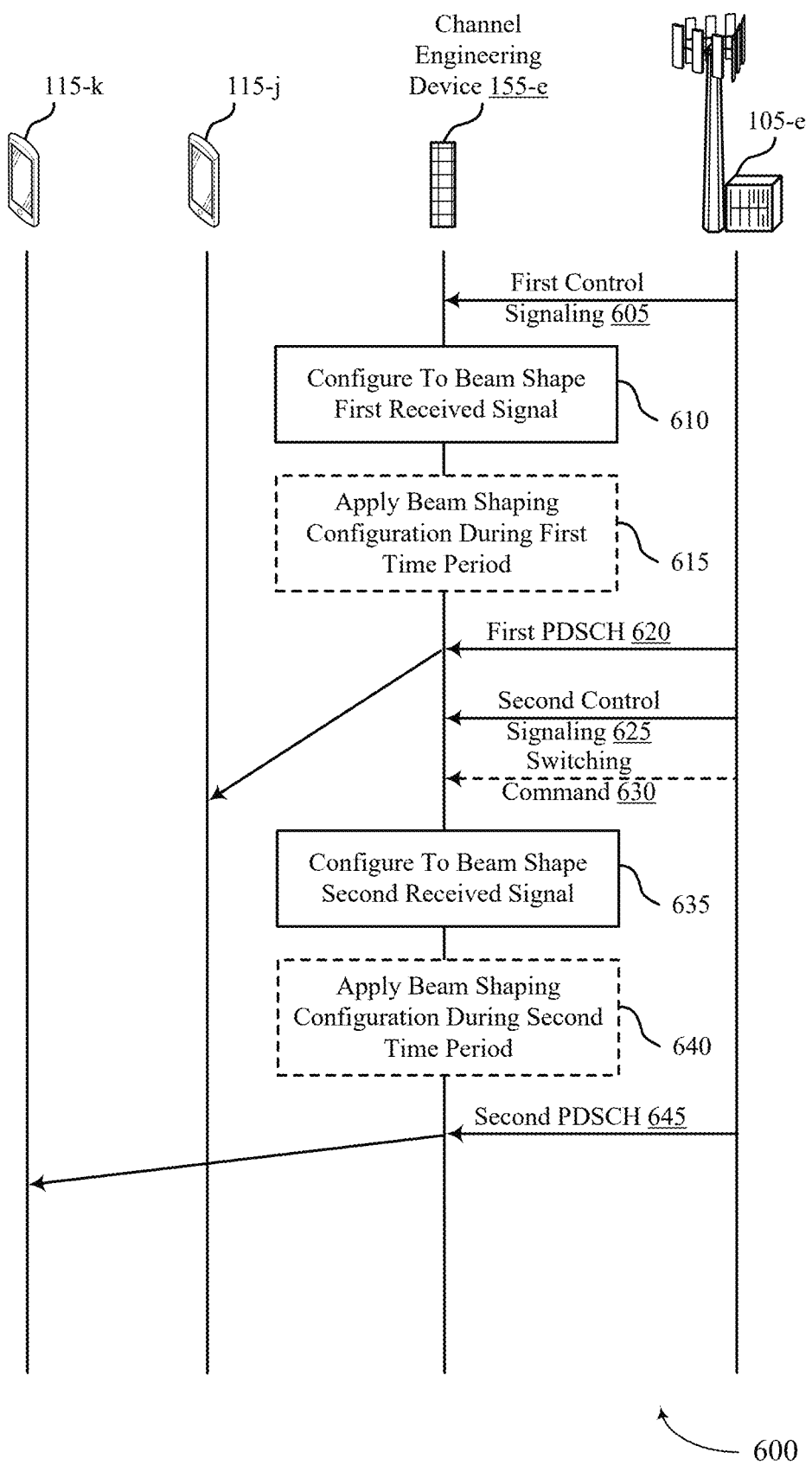

FIG. 6 illustrates an example of a process flow 600 in accordance with aspects of the present disclosure. In some examples, process flow 600 may implement aspects of wireless communications system 100, wireless communications system 200, wireless communications system 300, or a combination thereof. The process flow 600 may illustrate an example of a base station 105 configuring a channel engineering device 155 with a beam shaping configuration for communicating with a UE 115. Alternative examples of the following may be implemented, where some processes are performed in a different order than described or are not performed. In some cases, processes may include additional features not mentioned below, or further processes may be added.

At 605, base station 105-*e* may set a configuration for channel engineering device 155-*e* to communicate with UE 115-*j* using first control signaling. The configuration may include a beam shaping configuration for each time period (e.g., slot) base station 105-*e* is communicating with UE 115-*j*. The beam shaping configuration may modify one or more channel engineering device settings (e.g., beam shaping settings). In some cases, the channel engineering device 155-*e* may maintain the last setting until reconfigured. In some examples, the beam shaping configuration may be transmitted prior to the scheduled time period boundary (e.g., at the edge of a slot), which may provide channel engineering device 155-*e* time to decode the message including the beam shaping configuration and to apply the indicated one or more deflection settings.

At 610, channel engineering device 155-*e* may configure to beam shape a first received signal from UE 115-*j* based on the beam shaping configuration. In some cases, channel engineering device 155-*e* may perform the switch (e.g., configure to beam shape) at a designated time period boundary, which may be indicated at 605. The time period may be a slot, a symbol, a mini-slot, special slot, or a combination thereof.

At 615, channel engineering device 155-*e* may apply the beam shaping configuration during a first time period for deflecting signal energy toward UE 115-*j* during the first time period.

At 620, base station 105-*e* may communicate signaling with UE 115-*j* using channel engineering device 155-*e*. Channel engineering device 155-*e* may apply the beam shaping configuration to the signaling based on the first control signaling for deflecting signal energy toward UE 115-*j* during the first time period. In some cases, the signaling may be on a PDSCH, PUSCH, or both.

At 625, base station 105-*e* may transmit second control signaling to channel engineering device 155-*e* to configure channel engineering device 155-*e* for deflecting signal energy toward UE 115-k during a second time period. The second control signaling may include a beam shaping configuration, which may be different than the beam shaping configuration included in the first control signaling for communication with UE 115-j. At 630, the second control signaling may include a switching command indicating to channel engineering device 155-e to switch beam shaping configurations.

At 635, channel engineering device 155-e may apply the beam shaping configuration during the second time period based on receiving the switching command at 630, the second control signaling at 625, or both.

At 645, base station 105-e may communicate signaling with UE 115-k using channel engineering device 155-e. Channel engineering device 155-e may apply the beam shaping configuration to the signaling based on the second control signaling. In some cases, the signaling may be on a PDSCH, PUSCH, or both.

In some examples, to reduce signaling overhead and increase power saving at channel engineering device 155-e, base station 105-e may communicate a workplan (e.g., in the first control signaling) for a number of time periods ahead. For example, base station 105-e may transmit control signaling that may configure channel engineering device 155-e with multiple beam shaping configuration with a respective index. Base station 105-e may transmit the control signaling prior to the operations in process flow 600. Each control signaling in process flow 600 (e.g., at 605 and 625) may include an index corresponding to a beam shaping configuration.

In some cases, channel engineering device 155-e may continue to apply a beam shaping configuration until receiving control signaling that indicates to apply a different beam shaping configuration (e.g., in a sticky approach).

Figure 7:
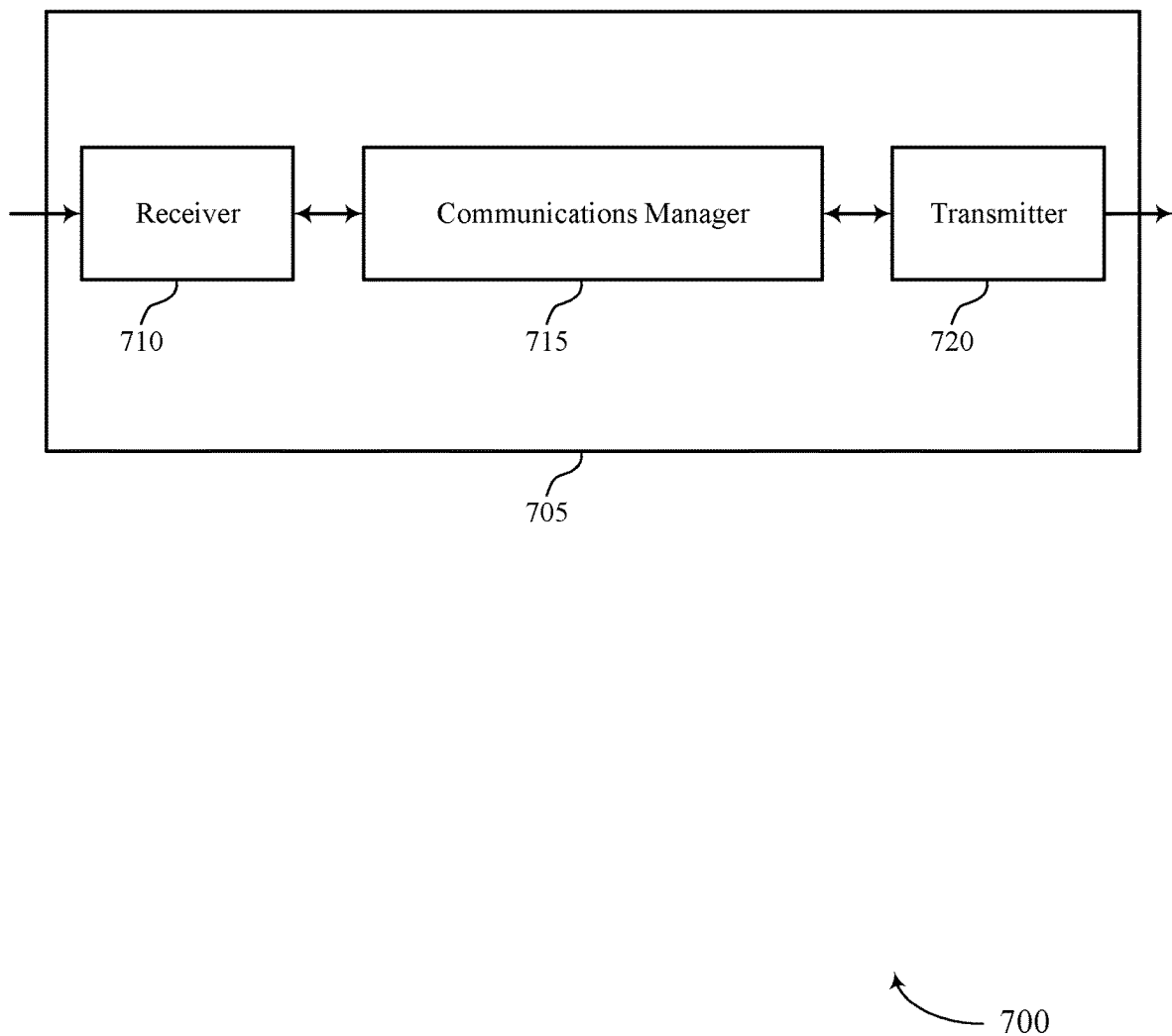
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a base station 105 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to real time control of an electronically configurable deflector, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit first control signaling that indicates a first beam shaping configuration for a channel engineering device to perform beam shaping of signals transmitted from the base station to a UE and transmit a signal to the channel engineering device based on the first control signaling. The communications manager 715 may be an example of aspects of the communications manager 1010 described herein.

The actions performed by the communications manager 715 as described herein may be implemented to realize one or more potential advantages. One implementation may enable a channel engineering device to apply a beam shaping configuration for communications between a base station and a UE. The beam shaping configuration may enable the channel engineering device to modify a directional beam to enhance link reliability and broaden the coverage area of the base station, which may improve communication latency (e.g., related to blockages between a UE and the base station), among other advantages.

Based on implementing the beam shaping configuration as described herein, a processor of a channel engineering device, a UE, or a base station (e.g., a processor controlling the receiver 710, the communications manager 715, the transmitter 720, or a combination thereof) may reduce the impact or likelihood of inefficient communications due to blockages while reducing the cost when compared with a repeater and ensuring relatively efficient communications. For example, the channel engineering device with a configurable metamaterial described herein may leverage a configuration of one or more settings of the metamaterial to focus received signal energy, reflect received signal energy, refract received signal energy, filter received signal energy, or any combination, which may realize power savings at the UE (e.g., due to enhancing the communication link between the UE and the base station), among other benefits.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
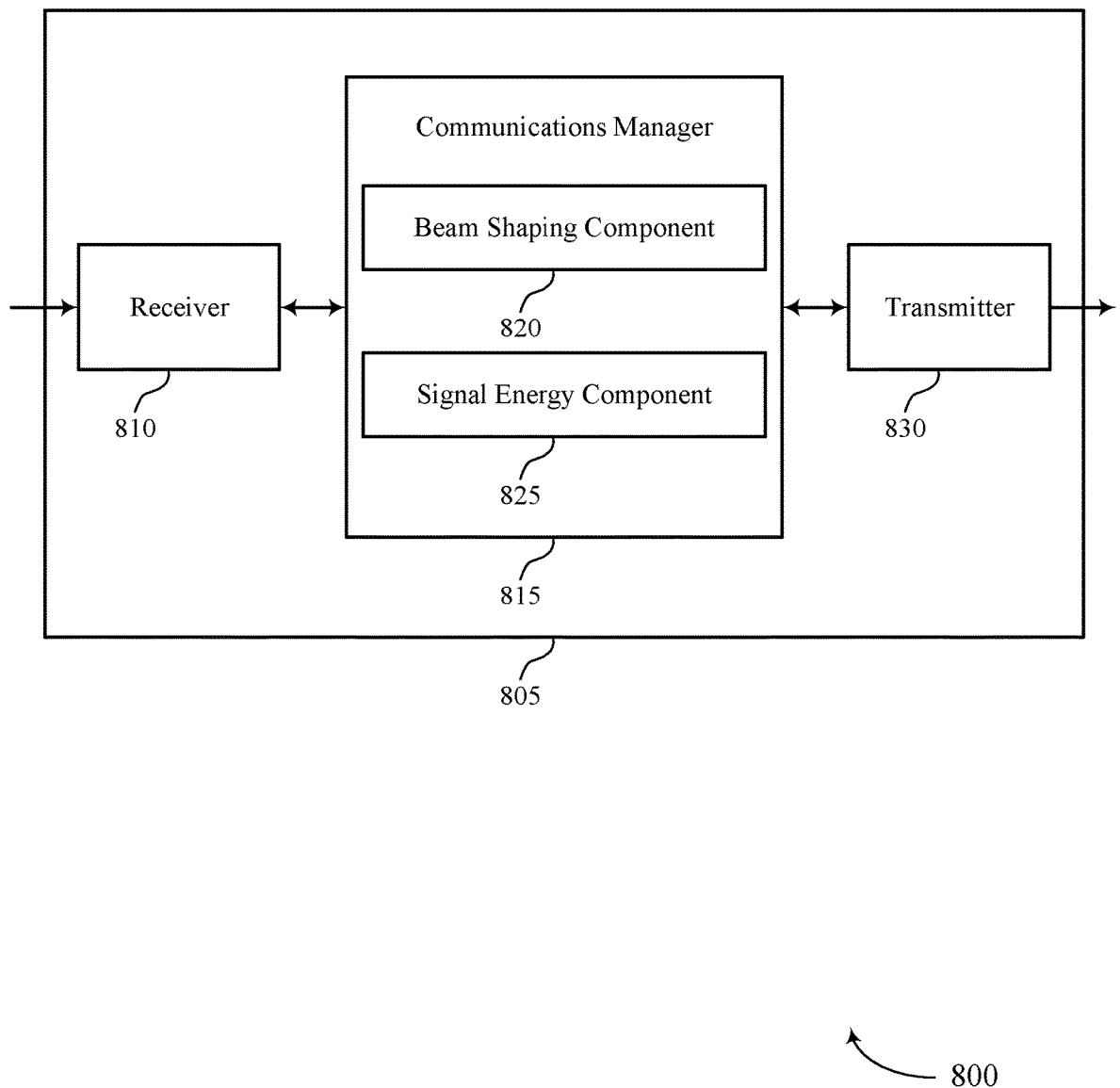

FIG. 8 shows a block diagram 800 of a device 805 in accordance with aspects of the present disclosure. The device 805 may be an example of aspects of a device 705, or a base station 105 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a beam shaping component 820 and a signal energy component 825. The communications manager 815 may be an example of aspects of the communications manager 1010 described herein.

The beam shaping component 820 may transmit first control signaling that indicates a first beam shaping configuration for a channel engineering device to perform beam shaping of signals transmitted from the base station to a UE. The signal energy component 825 may transmit a signal to the channel engineering device based on the first control signaling.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
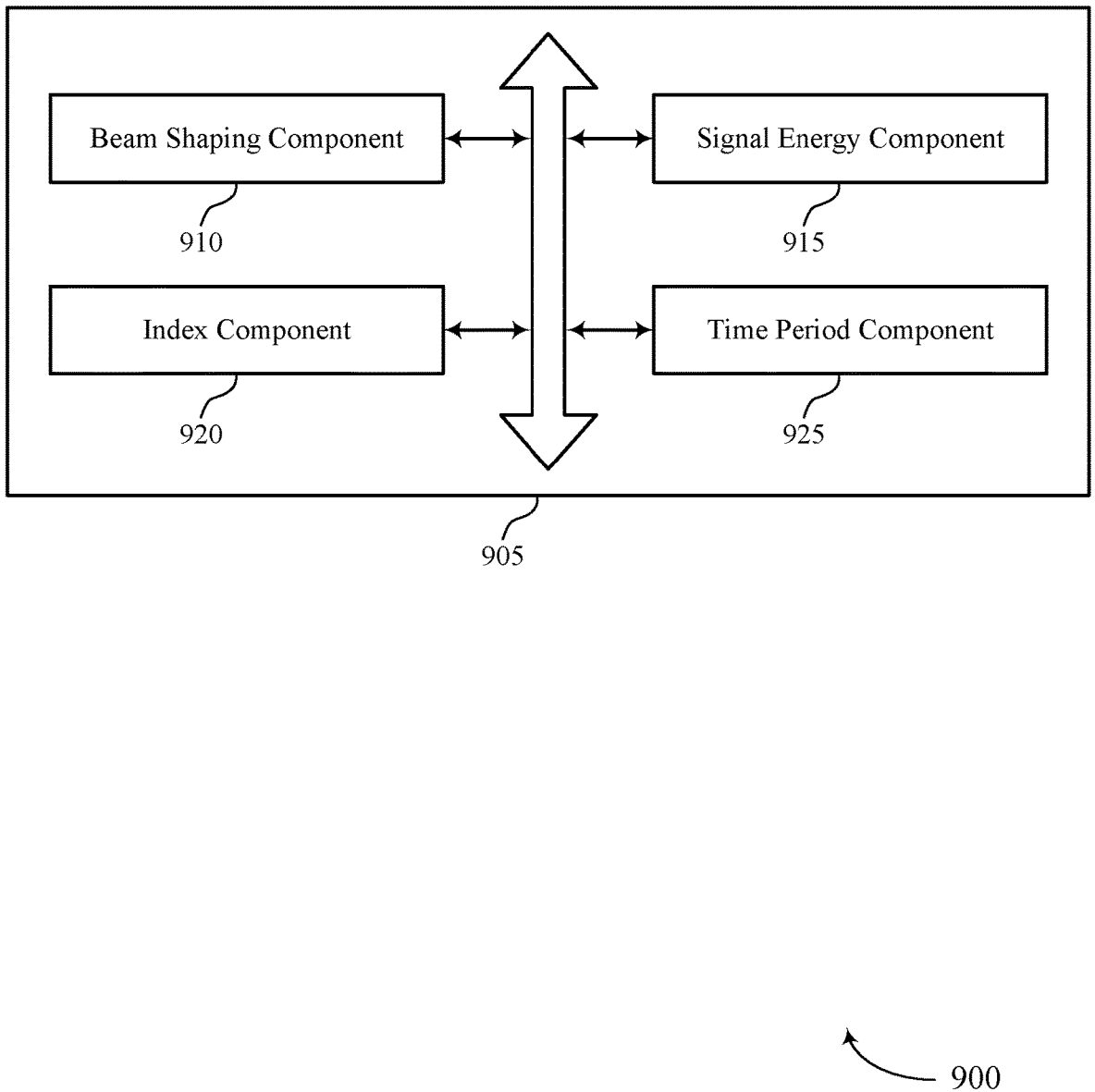
FIG. 9 shows a block diagram of a communications manager in accordance with aspects of the present disclosure.

FIG. 9 shows a block diagram 900 of a communications manager 905 in accordance with aspects of the present disclosure. The communications manager 905 may be an example of aspects of a communications manager 715, a communications manager 815, or a communications manager 1010 described herein. The communications manager 905 may include a beam shaping component 910, a signal energy component 915, an index component 920, and a time period component 925. Each of these modules may communicate, directly or indirectly, with one another (e.g., via one or more buses).

The beam shaping component 910 may transmit first control signaling that indicates a first beam shaping configuration for a channel engineering device to perform beam shaping of signals transmitted from the base station to a UE. The signal energy component 915 may transmit a signal to the channel engineering device based on the first control signaling.

The index component 920 may transmit second control signaling that configures the channel engineering device with a set of beam shaping configurations and a respective index of a set of indexes corresponding to a respective beam shaping configuration of the set of beam shaping configurations, where the first control signaling indicates a first index of the set of indexes that corresponds to the first beam shaping configuration.

In some examples, the beam shaping component 910 may transmit the first control signaling that indicates a second beam shaping configuration different from the first beam shaping configuration. In some examples, the beam shaping component 910 may transmit, to the channel engineering device, a switching command indicating to switch between the first beam shaping configuration and the second beam shaping configuration.

In some examples, the beam shaping component 910 may update a list of one or more beam shaping settings corresponding to the first beam shaping configuration. In some examples, the beam shaping component 910 may transmit, to the channel engineering device, the first control signaling that indicates the list of one or more beam shaping settings.

In some examples, the beam shaping component 910 may transmit the first control signaling that indicates to apply the first beam shaping configuration until receiving second control signaling to apply a second beam shaping configuration different from the first beam shaping configuration.

The time period component 925 may transmit the first control signaling that indicates a first time period in which to apply the first beam shaping configuration. In some examples, the time period component 925 may transmit the first control signaling that indicates a second time period in which to apply a second beam shaping configuration different from the first beam shaping configuration. In some examples, the time period component 925 may transmit the first control signaling that indicates a set of time periods corresponding to a set of beam shaping configurations. In some examples, the time period component 925 may transmit the first control signaling prior to a time period boundary between adjacent time periods, the time period boundary preceding a time period in which the first beam shaping configuration is to be applied.

Figure 10:
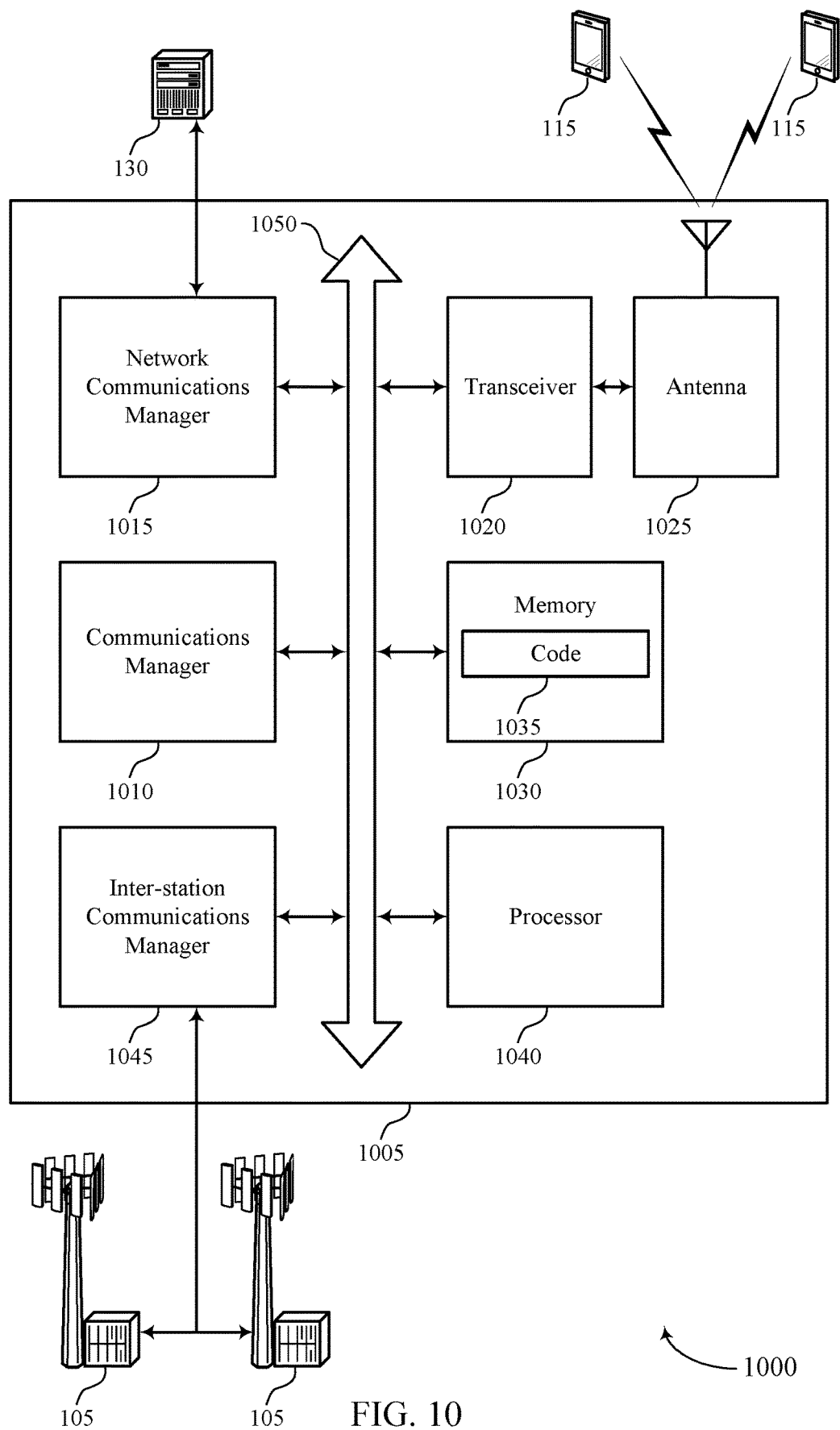
FIG. 10 shows a diagram of a system including a device in accordance with aspects of the present disclosure.

FIG. 10 shows a diagram of a system 1000 including a device 1005 in accordance with aspects of the present disclosure. The device 1005 may be an example of or include the components of device 705, device 805, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The communications manager 1010 may transmit first control signaling that indicates a first beam shaping configuration for a channel engineering device to perform beam shaping of signals transmitted from the base station to a UE and transmit a signal to the channel engineering device based on the first control signaling.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM), read-only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting real time control of an electronically configurable deflector).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
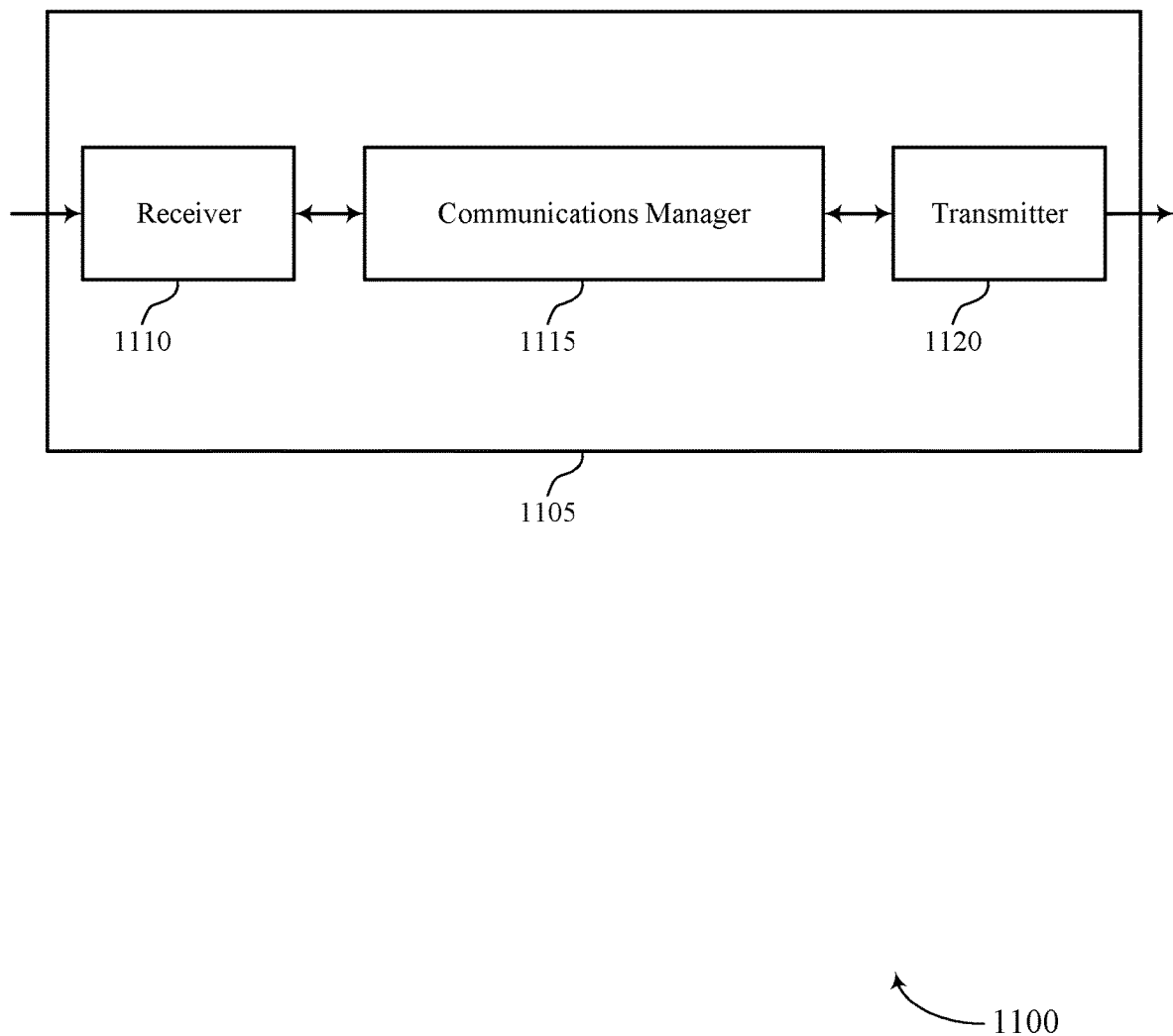
FIGS. 11 and 12 show block diagrams of devices in accordance with aspects of the present disclosure.

FIG. 11 shows a block diagram 1100 of a channel engineering device 1105 in accordance with aspects of the present disclosure. The channel engineering device 1105 may be an example of aspects of a device as described herein. The channel engineering device 1105 may include a receiver 1110, a communications manager 1115, and a transmitter 1120. The device 1105 may also include a processor and an electronic metamaterial. Each of these components may be in communication with one another (e.g., via one or more buses).

The receiver 1110 may receive information such as packets, user data, or control information associated with various information channels (e.g., control channels, data channels, and information related to real time control of an electronically configurable deflector, etc.). Information may be passed on to other components of the channel engineering device 1105. The receiver 1110 may be an example of aspects of the transceiver 1420 described with reference to FIG. 14. The receiver 1110 may utilize a single antenna or a set of antennas.

The communications manager 1115 may receive, from a base station, first control signaling that indicates a first beam shaping configuration for the channel engineering device to perform beam shaping of signals transmitted from the base station to a UE and configure the channel engineering device to beam shape received signal energy in accordance with the first beam shaping configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the channel engineering device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
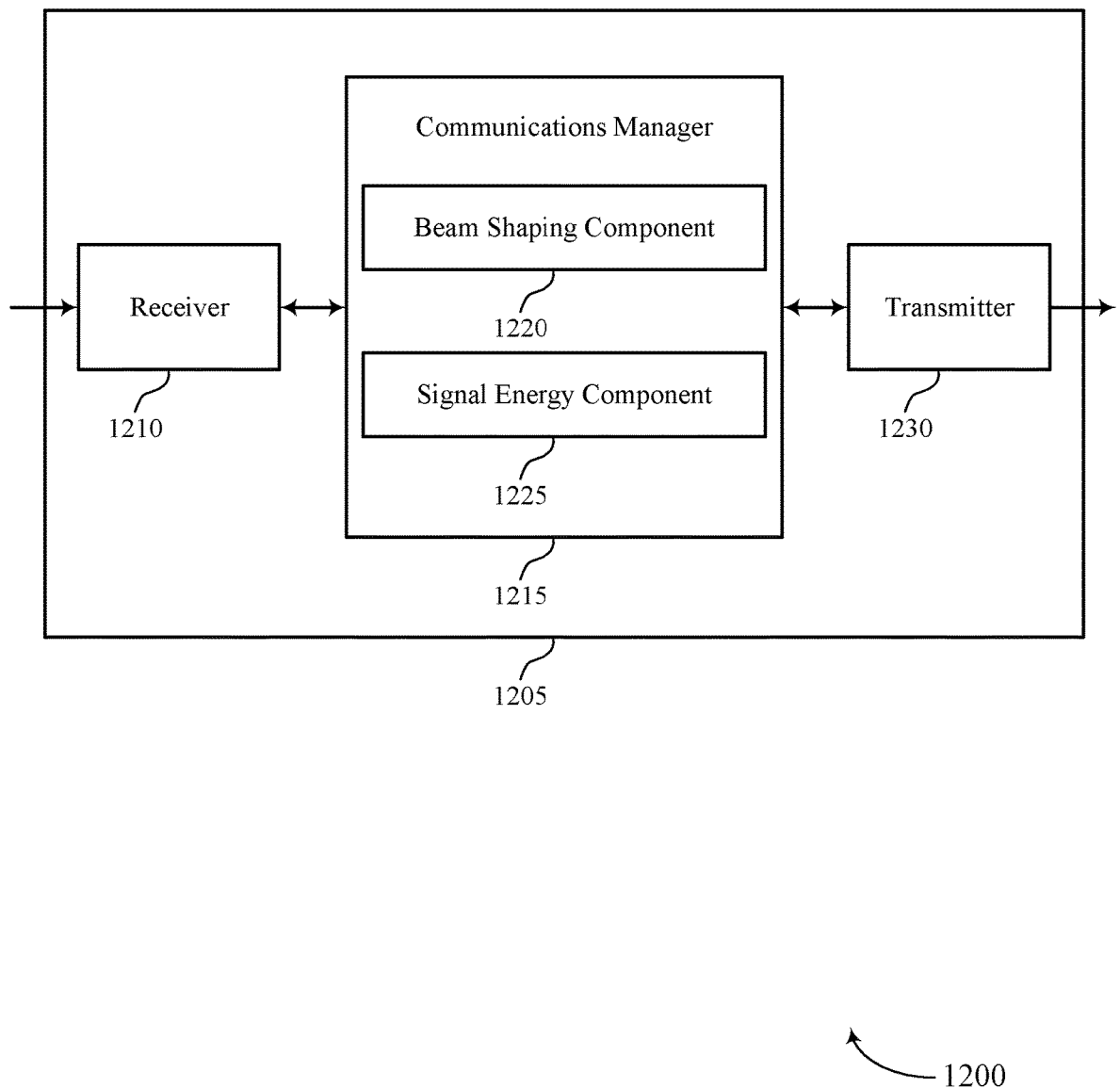

FIG. 12 shows a block diagram 1200 of a channel engineering device 1205 in accordance with aspects of the present disclosure. The channel engineering device 1205 may be an example of aspects of a channel engineering device 1105 as described herein. The channel engineering device 1205 may include a receiver 1210, a communications manager 1215, and a transmitter 1230. The channel engineering device 1205 may also include a processor and an electronic metamaterial. Each of these components may be in communication with one another (e.g., via one or more buses).

The receiver 1210 may receive information such as packets, user data, or control information associated with various information channels (e.g., control channels, data channels, and information related to real time control of an electronically configurable deflector, etc.). Information may be passed on to other components of the channel engineering device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a beam shaping component 1220 and a signal energy component 1225. The communications manager 1215 may be an example of aspects of the communications manager 1410 described herein.

The beam shaping component 1220 may receive, from a base station, first control signaling that indicates a first beam shaping configuration for the channel engineering device to perform beam shaping of signals transmitted from the base station to a UE. The signal energy component 1225 may configure the channel engineering device to beam shape received signal energy in accordance with the first beam shaping configuration.

The transmitter 1230 may transmit signals generated by other components of the channel engineering device 1205.

In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
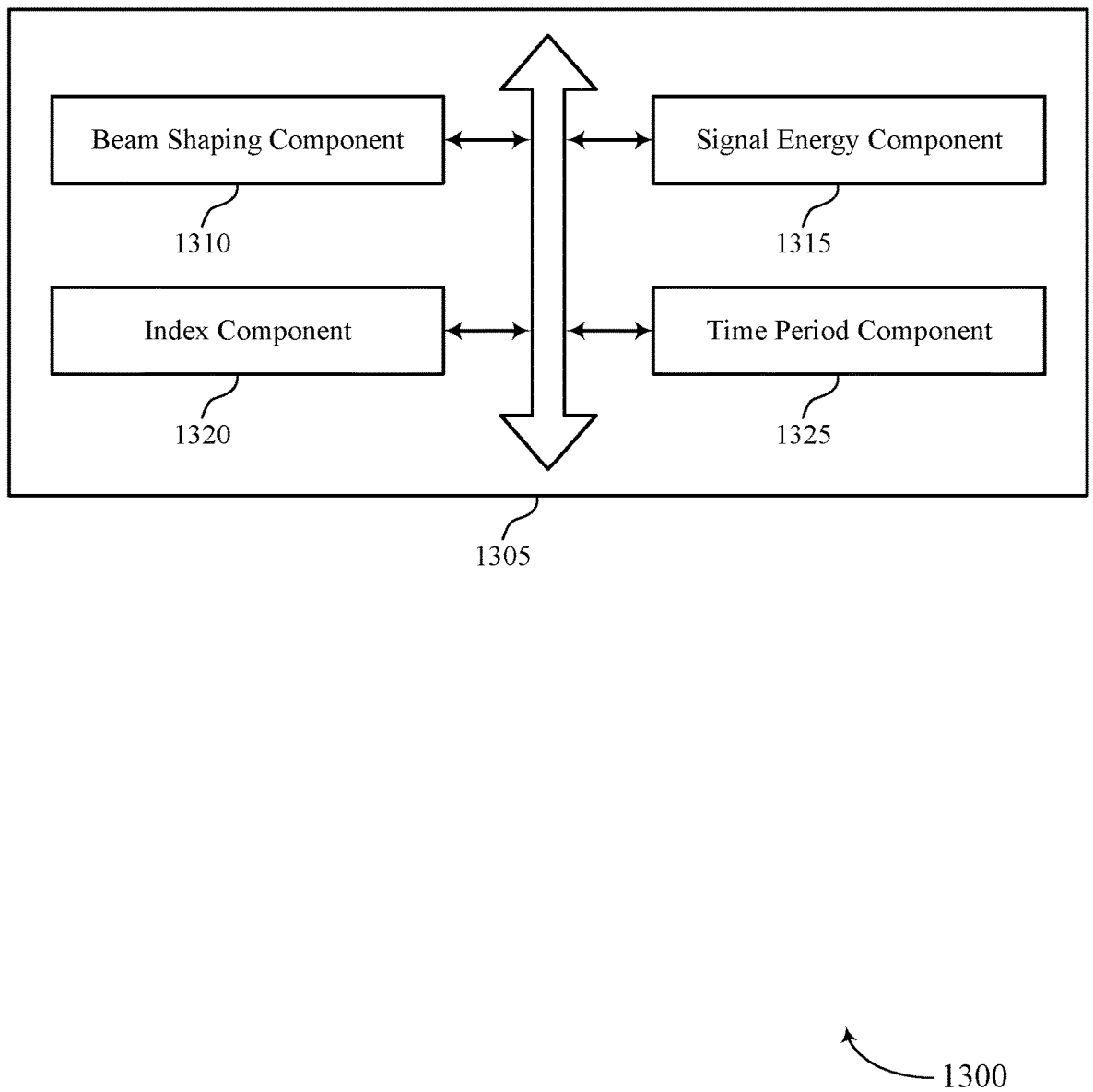
FIG. 13 shows a block diagram of a communications manager in accordance with aspects of the present disclosure.

FIG. 13 shows a block diagram 1300 of a communications manager 1305 in accordance with aspects of the present disclosure. The communications manager 1305 may be an example of aspects of a communications manager 1115, a communications manager 1215, or a communications manager 1410 described herein. The communications manager 1305 may include a beam shaping component 1310, a signal energy component 1315, an index component 1320, and a time period component 1325. Each of these modules may communicate, directly or indirectly, with one another (e.g., via one or more buses). The actions performed by the communications manager 1305 may be implemented by a channel engineering device.

The beam shaping component 1310 may receive, from a base station, first control signaling that indicates a first beam shaping configuration for the channel engineering device to perform beam shaping of signals transmitted from the base station to a UE. The signal energy component 1315 may configure the channel engineering device to beam shape received signal energy in accordance with the first beam shaping configuration.

The index component 1320 may receive second control signaling that configures the channel engineering device with a set of beam shaping configurations and a respective index of a set of indexes corresponding to a respective beam shaping configuration of the set of beam shaping configurations, where the first control signaling indicates a first index of the set of indexes that corresponds to the first beam shaping configuration.

In some examples, the beam shaping component 1310 may receive the first control signaling that indicates a second beam shaping configuration different from the first beam shaping configuration. In some examples, the beam shaping component 1310 may receive a switching command indicating to switch between the first beam shaping configuration and the second beam shaping configuration.

In some examples, the beam shaping component 1310 may receive the first control signaling that indicates the first beam shaping configuration including a list of one or more beam shaping settings.

In some examples, the beam shaping component 1310 may receive the first control signaling that indicates to apply the first beam shaping configuration until receiving second control signaling to apply a second beam shaping configuration different from the first beam shaping configuration. The time period component 1325 may receive the first control signaling that indicates a first time period in which to apply the first beam shaping configuration.

In some examples, the time period component 1325 may receive the first control signaling that indicates a second time period in which to apply a second beam shaping configuration different from the first beam shaping configuration. In some examples, the time period component 1325 may receive the first control signaling that indicates a set of time periods corresponding to a set of beam shaping configurations. In some examples, the time period component 1325 may apply a respective beam shaping configuration of the set of beam shaping configurations during a respective time period of the set of time periods based on the first control signaling. In some examples, the time period component 1325 may receive the first control signaling prior to a time period boundary between adjacent time periods, the time period boundary preceding a time period in which the first beam shaping configuration is to be applied.

Figure 14:
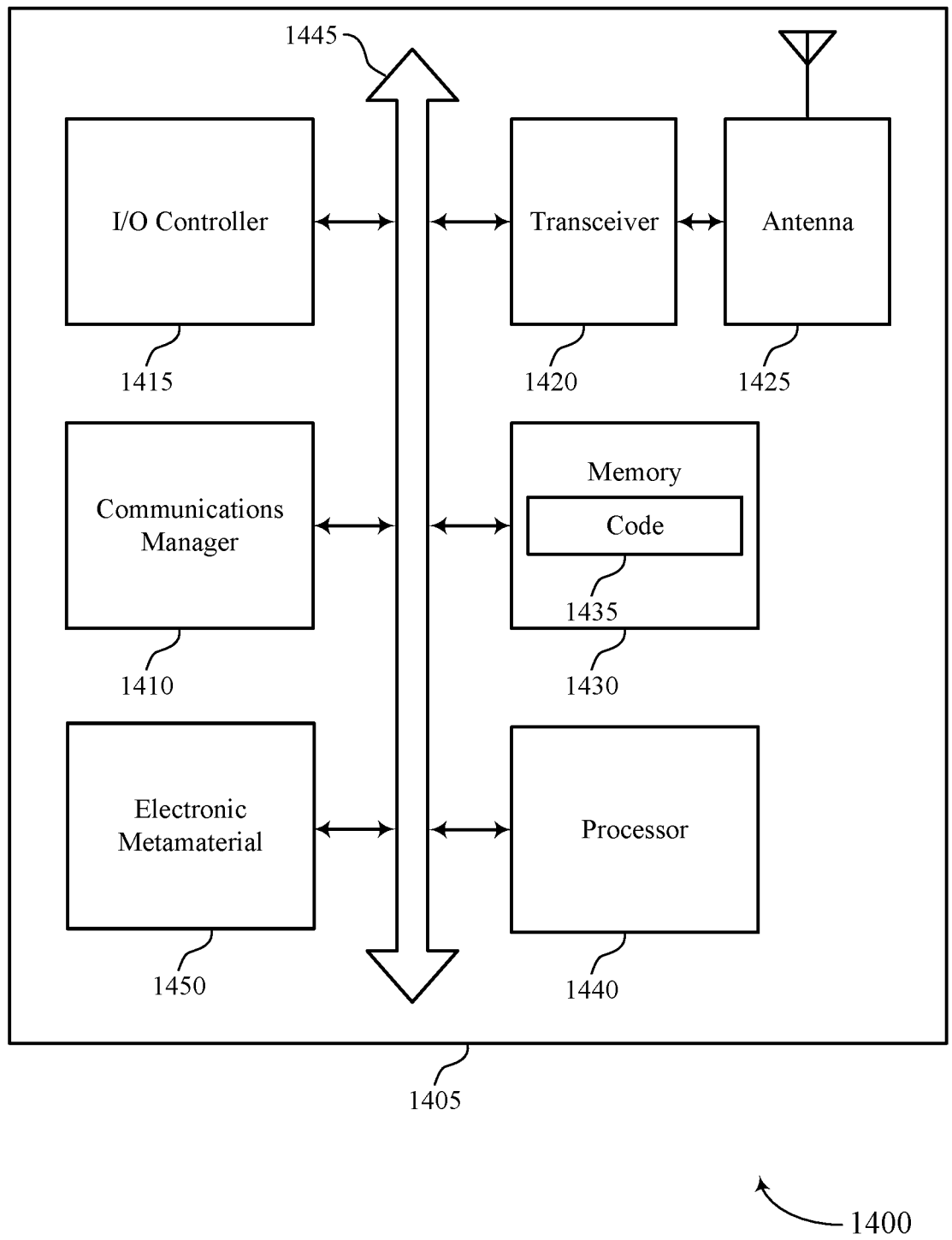
FIG. 14 shows a diagram of a system including a device in accordance with aspects of the present disclosure.

FIG. 14 shows a diagram of a system 1400 including a device 1405 in accordance with aspects of the present disclosure. The channel engineering device 1405 may be an example of or include the components of channel engineering device 1105, channel engineering device 1205, or a channel engineering device 155 as described herein. The channel engineering device 1405 may include components for bi-directional voice and data communications including components for transmitting and receiving communications, including a communications manager 1410, an I/O controller 1415, a transceiver 1420, an antenna 1425, memory 1430, a processor 1440, and an electronic metamaterial 1450. These components may be in electronic communication via one or more buses (e.g., bus 1445).

The communications manager 1410 may receive, from a base station, first control signaling that indicates a first beam shaping configuration for the channel engineering device to perform beam shaping of signals transmitted from the base station to a UE and configure the channel engineering device to beam shape received signal energy in accordance with the first beam shaping configuration.

The I/O controller 1415 may manage input and output signals for the device 1405. The I/O controller 1415 may also manage peripherals not integrated into the channel engineering device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the channel engineering device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting real time control of an electronically configurable deflector). In some examples, the electronic metamaterial 1450 may focus received signal energy (e.g., focusing refraction), reflect received signal energy, refract received signal energy, filter received signal energy, or any combination to enhance a communication link between a base station 105 and a UE 115.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
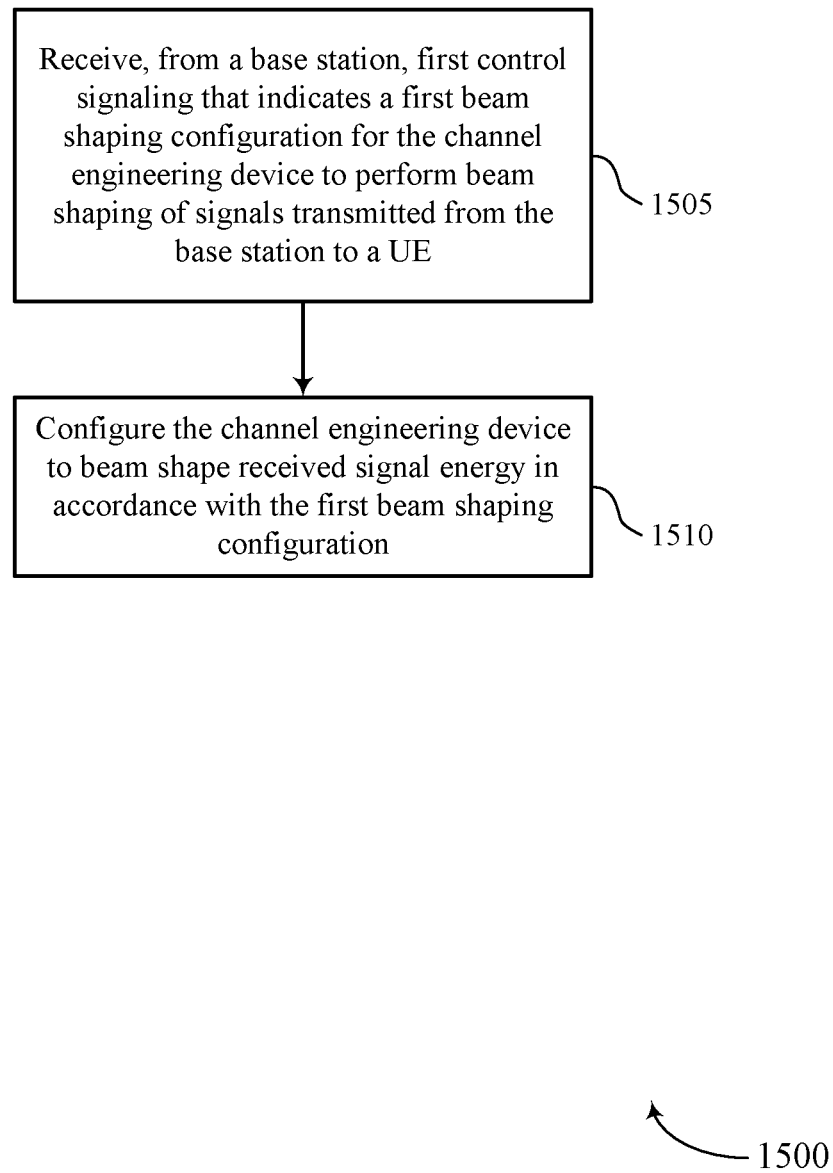
FIGS. 15 through 18 show flowcharts illustrating methods in accordance with aspects of the present disclosure.

FIG. 15 shows a flowchart illustrating a method 1500 in accordance with aspects of the present disclosure. The operations of method 1500 may be implemented by a device or its components as described herein. For example, the operations of method 1500 may be performed by a communications manager as described with reference to FIGS. 11 through 14. In some examples, a device may execute a set of instructions to control the functional elements of the device to perform the functions described below. Additionally or alternatively, a device may perform aspects of the functions described below using special-purpose hardware.

At 1505, the device may receive, from a base station, first control signaling that indicates a first beam shaping configuration for the channel engineering device to perform beam shaping of signals transmitted from the base station to a UE. The operations of 1505 may be performed according to the methods described herein. In some examples, aspects of the operations of 1505 may be performed by a beam shaping component as described with reference to FIGS. 11 through 14.

At 1510, the device may configure the channel engineering device to beam shape received signal energy in accordance with the first beam shaping configuration. The operations of 1510 may be performed according to the methods described herein. In some examples, aspects of the operations of 1510 may be performed by a signal energy component as described with reference to FIGS. 11 through 14.

Figure 16:
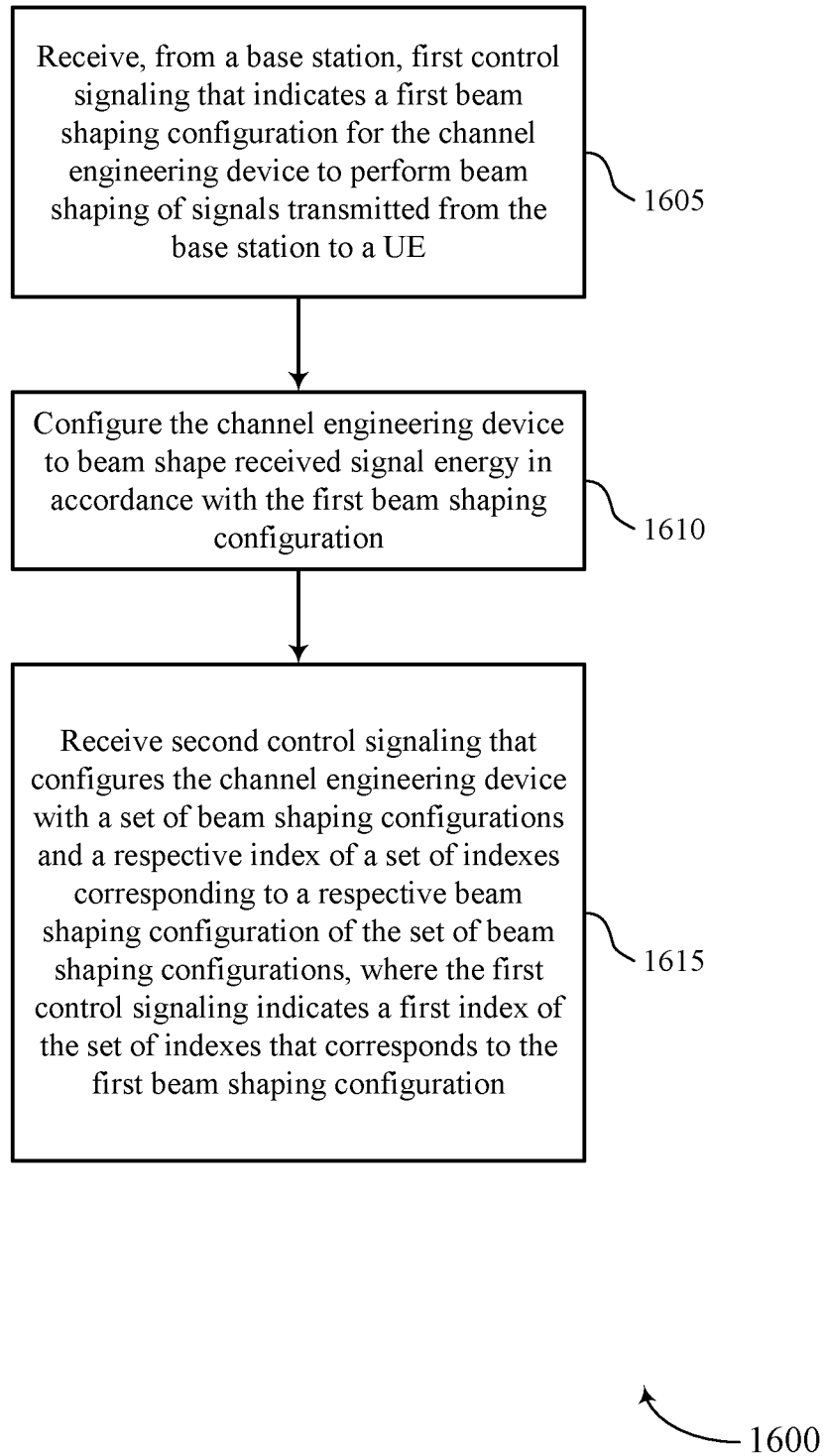

FIG. 16 shows a flowchart illustrating a method 1600 in accordance with aspects of the present disclosure. The operations of method 1600 may be implemented by a device or its components as described herein. For example, the operations of method 1600 may be performed by a communications manager as described with reference to FIGS. 11 through 14. In some examples, a device may execute a set of instructions to control the functional elements of the device to perform the functions described below. Additionally or alternatively, a device may perform aspects of the functions described below using special-purpose hardware.

At 1605, the device may receive, from a base station, first control signaling that indicates a first beam shaping configuration for the channel engineering device to perform beam shaping of signals transmitted from the base station to a UE. The operations of 1605 may be performed according to the methods described herein. In some examples, aspects of the operations of 1605 may be performed by a beam shaping component as described with reference to FIGS. 11 through 14.

At 1610, the device may configure the channel engineering device to beam shape received signal energy in accordance with the first beam shaping configuration. The operations of 1610 may be performed according to the methods described herein. In some examples, aspects of the operations of 1610 may be performed by a signal energy component as described with reference to FIGS. 11 through 14.

At 1615, the device may receive second control signaling that configures the channel engineering device with a set of beam shaping configurations and a respective index of a set of indexes corresponding to a respective beam shaping configuration of the set of beam shaping configurations, where the first control signaling indicates a first index of the set of indexes that corresponds to the first beam shaping configuration. The operations of 1615 may be performed according to the methods described herein. In some examples, aspects of the operations of 1615 may be performed by an index component as described with reference to FIGS. 11 through 14.

Figure 17:
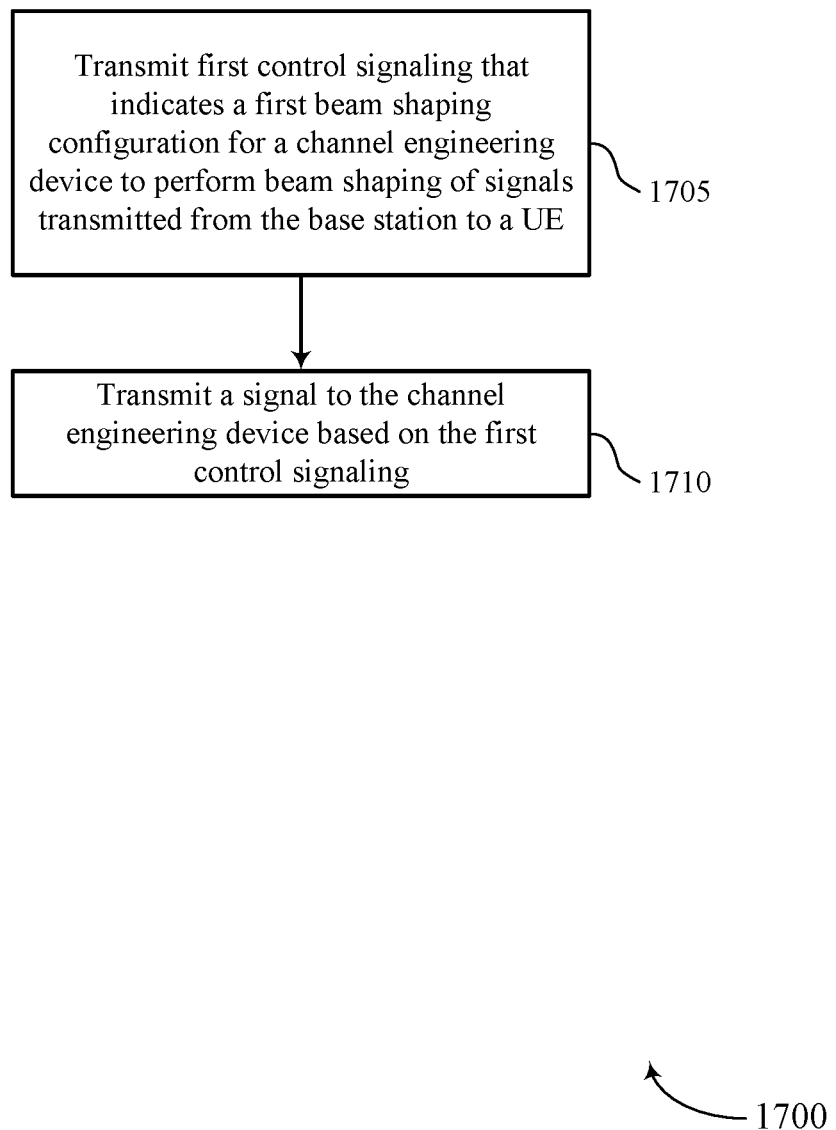

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1705, the base station may transmit first control signaling that indicates a first beam shaping configuration for a channel engineering device to perform beam shaping of signals transmitted from the base station to a UE. The operations of 1705 may be performed according to the methods described herein. In some examples, aspects of the operations of 1705 may be performed by a beam shaping component as described with reference to FIGS. 7 through 10.

At 1710, the base station may transmit a signal to the channel engineering device based on the first control signaling. The operations of 1710 may be performed according to the methods described herein. In some examples, aspects of the operations of 1710 may be performed by a signal energy component as described with reference to FIGS. 7 through 10.

Figure 18:
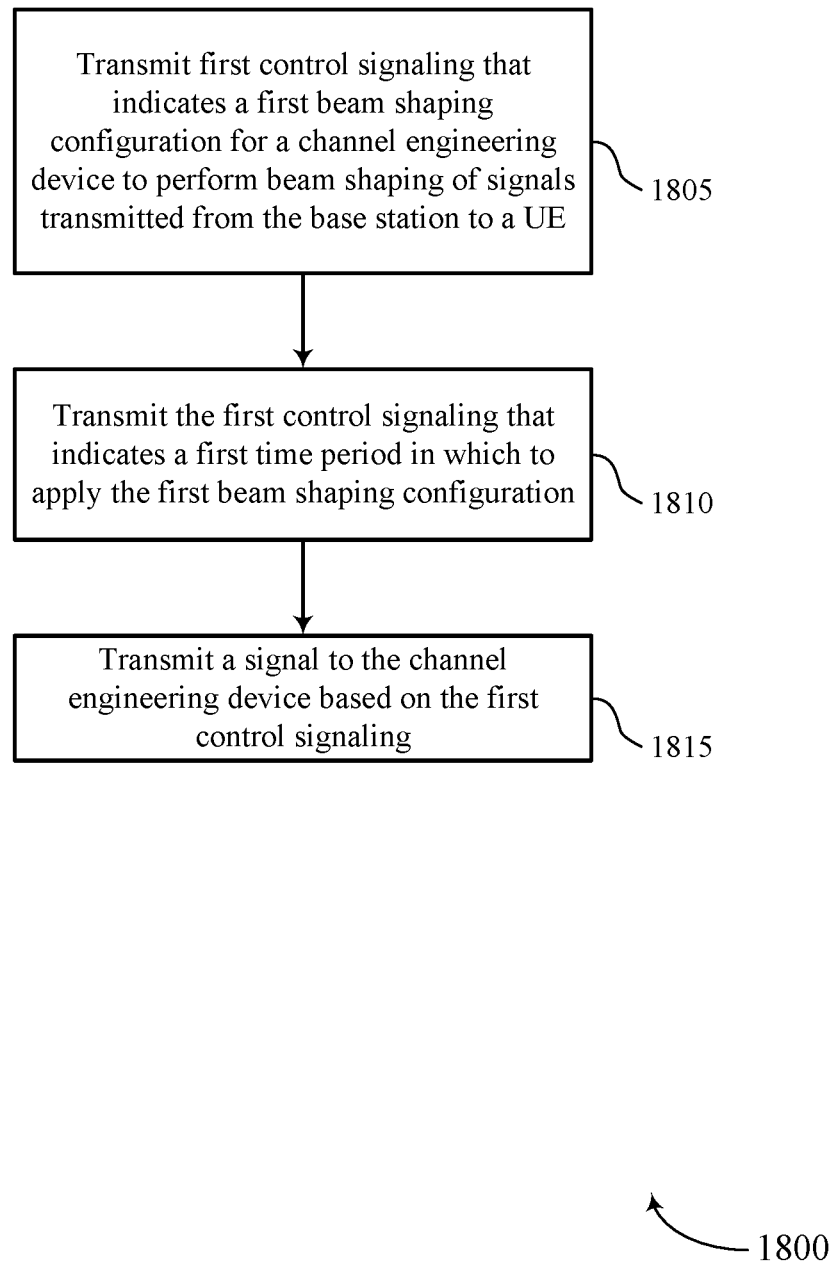

FIG. 18 shows a flowchart illustrating a method 1800 in accordance with aspects of the present disclosure. The operations of method 1800 may be implemented by a base station 105 or its components as described herein. For example, the operations of method 1800 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1805, the base station may transmit first control signaling that indicates a first beam shaping configuration for a channel engineering device to perform beam shaping of signals transmitted from the base station to a UE. The operations of 1805 may be performed according to the methods described herein. In some examples, aspects of the operations of 1805 may be performed by a beam shaping component as described with reference to FIGS. 7 through 10.

At 1810, the base station may transmit the first control signaling that indicates a first time period in which to apply the first beam shaping configuration. The operations of 1810 may be performed according to the methods described herein. In some examples, aspects of the operations of 1810 may be performed by a time period component as described with reference to FIGS. 7 through 10.

At 1815, the base station may transmit a signal to the channel engineering device based on the first control signaling. The operations of 1815 may be performed according to the methods described herein. In some examples, aspects of the operations of 1815 may be performed by a signal energy component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a channel engineering device, comprising: receiving, from a base station, first control signaling that indicates a first beam shaping configuration for the channel engineering device to perform beam shaping of signals transmitted from the base station to a user equipment; and configuring the channel engineering device to beam shape received signal energy in accordance with the first beam shaping configuration.

Aspect 2: The method of aspect 1, further comprising: receiving second control signaling that configures the channel engineering device with a plurality of beam shaping configurations and a respective index of a plurality of indexes corresponding to a respective beam shaping configuration of the plurality of beam shaping configurations, wherein the first control signaling indicates a first index of the plurality of indexes that corresponds to the first beam shaping configuration.

Aspect 3: The method of any of aspects 1 through 2, wherein receiving the first control signaling comprises: receiving the first control signaling that indicates a first time period in which to apply the first beam shaping configuration.

Aspect 4: The method of aspect 3, wherein receiving the first control signaling comprises: receiving the first control signaling that indicates a second time period in which to apply a second beam shaping configuration different from the first beam shaping configuration.

Aspect 5: The method of any of aspects 1 through 2, wherein receiving the first control signaling comprises: receiving the first control signaling that indicates a plurality of time periods corresponding to a plurality of beam shaping configurations; and applying a respective beam shaping configuration of the plurality of beam shaping configurations during a respective time period of the plurality of time periods based at least in part on the first control signaling.

Aspect 6: The method of any of aspects 1 through 2, wherein receiving the first control signaling comprises: receiving the first control signaling that indicates a second beam shaping configuration different from the first beam shaping configuration; and receiving a switching command indicating to switch between the first beam shaping configuration and the second beam shaping configuration.

Aspect 7: The method of any of aspects 1 through 6, wherein receiving the first control signaling comprises: receiving the first control signaling that indicates the first beam shaping configuration comprising a list of one or more beam shaping settings.

Aspect 8: The method of any of aspects 1 through 7, further comprising: receiving the first control signaling prior to a time period boundary between adjacent time periods, the time period boundary preceding a time period in which the first beam shaping configuration is to be applied.

Aspect 9: The method of aspect 8, wherein the time period is a slot, a symbol period, a mini-slot, a plurality of symbol periods, or a combination thereof.

Aspect 10: The method of any of aspects 1 through 9, wherein receiving the first control signaling comprises: receiving the first control signaling that indicates to apply the first beam shaping configuration until receiving second control signaling to apply a second beam shaping configuration different from the first beam shaping configuration.

Aspect 11: The method of any of aspects 1 through 10, wherein the first beam shaping configuration indicates one or more settings to adjust an electronic metamaterial of the channel engineering device to focus the received signal energy, reflect the received signal energy, refract the received signal energy, filter the received signal energy, or any combination thereof.

Aspect 12: A method for wireless communications at a base station, comprising: transmitting first control signaling that indicates a first beam shaping configuration for a channel engineering device to perform beam shaping of signals transmitted from the base station to a user equipment; and transmitting a signal to the channel engineering device based at least in part on the first control signaling.

Aspect 13: The method of aspect 12, further comprising: transmitting second control signaling that configures the channel engineering device with a plurality of beam shaping configurations and a respective index of a plurality of indexes corresponding to a respective beam shaping configuration of the plurality of beam shaping configurations, wherein the first control signaling indicates a first index of the plurality of indexes that corresponds to the first beam shaping configuration.

Aspect 14: The method of any of aspects 12 through 13, wherein transmitting the first control signaling comprises: transmitting the first control signaling that indicates a first time period in which to apply the first beam shaping configuration.

Aspect 15: The method of aspect 14, wherein transmitting the first control signaling comprises: transmitting the first control signaling that indicates a second time period in which to apply a second beam shaping configuration different from the first beam shaping configuration.

Aspect 16: The method of any of aspects 12 through 13, wherein transmitting the first control signaling comprises: transmitting the first control signaling that indicates a plurality of time periods corresponding to a plurality of beam shaping configurations.

Aspect 17: The method of any of aspects 12 through 16, wherein transmitting the first control signaling comprises: transmitting the first control signaling that indicates a second beam shaping configuration different from the first beam shaping configuration; and transmitting, to the channel engineering device, a switching command indicating to switch between the first beam shaping configuration and the second beam shaping configuration.

Aspect 18: The method of any of aspects 12 through 17, wherein receiving the first control signaling comprises: updating a list of one or more beam shaping settings corresponding to the first beam shaping configuration; and transmitting, to the channel engineering device, the first control signaling that indicates the list of one or more beam shaping settings.

Aspect 19: The method of any of aspects 12 through 18, further comprising: transmitting the first control signaling prior to a time period boundary between adjacent time periods, the time period boundary preceding a time period in which the first beam shaping configuration is to be applied.

Aspect 20: The method of aspect 19, wherein the time period is a slot, a symbol period, a mini-slot, a plurality of symbol periods, or a combination thereof.

Aspect 21: The method of any of aspects 12 through 20, wherein transmitting the first control signaling comprises: transmitting the first control signaling that indicates to apply the first beam shaping configuration until receiving second control signaling to apply a second beam shaping configuration different from the first beam shaping configuration.

Aspect 22: The method of any of aspects 12 through 21, wherein the first beam shaping configuration indicates one or more settings to adjust an electronic metamaterial of the channel engineering device to focus received signal energy, reflect the received signal energy, refract the received signal energy, filter the received signal energy, or any combination thereof.

Aspect 23: An apparatus for wireless communications at a channel engineering device, comprising a processor; memory coupled with the processor; and instructions stored in the memory and executable by the processor to cause the apparatus to perform a method of any of aspects 1 through 11.

Aspect 24: An apparatus for wireless communications at a channel engineering device, comprising at least one means for performing a method of any of aspects 1 through 11.

Aspect 25: A non-transitory computer-readable medium storing code for wireless communications at a channel engineering device, the code comprising instructions executable by a processor to perform a method of any of aspects 1 through 11.

Aspect 26: An apparatus for wireless communications at a base station, comprising a processor; memory coupled with the processor; and instructions stored in the memory and executable by the processor to cause the apparatus to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a passive channel engineering device, comprising:
   receiving, from a network entity, first control signaling that indicates a plurality of beam shaping configurations for the passive channel engineering device to perform beam shaping and deflection of signals transmitted from the network entity to a respective plurality of user equipment, wherein the first control signaling indicates a plurality of time periods associated with the passive channel engineering device deflecting and beam shaping the signals in a plurality of directions of the respective plurality of user equipment; and
   configuring the passive channel engineering device to beam shape and deflect received signal energy in a first direction of a user equipment of the respective plurality of user equipment in accordance with a first beam shaping configuration of the plurality of beam shaping configurations during a first time period of the plurality of time periods.

2. The method of claim 1, further comprising:
   receiving second control signaling that configures the passive channel engineering device with a respective index of a plurality of indexes corresponding to a respective beam shaping configuration of the plurality of beam shaping configurations.

3. The method of claim 1, wherein the first time period of the plurality of time periods is associated with the first beam shaping configuration.

4. The method of claim 3, wherein
   the first control signaling indicates the first time period in which to apply the first beam shaping configuration and a second time period in which to apply a second beam shaping configuration that is different from the first beam shaping configuration.

5. The method of claim 1, wherein receiving the first control signaling comprises:
   applying the first beam shaping configuration of the plurality of beam shaping configurations during the first time period of the plurality of time periods based at least in part on the first control signaling.

6. The method of claim 1, wherein receiving the first control signaling comprises:
   receiving the first control signaling that indicates a second beam shaping configuration different from the first beam shaping configuration; and
   receiving a switching command indicating to switch between the first beam shaping configuration and the second beam shaping configuration.

7. The method of claim 1, wherein receiving the first control signaling comprises:
   receiving the first control signaling that indicates the first beam shaping configuration comprising a list of one or more beam shaping settings.

8. The method of claim 1, further comprising:
   receiving the first control signaling prior to a time period boundary between adjacent time periods, the time period boundary preceding a time period in which the first beam shaping configuration is to be applied.

9. The method of claim 8, wherein the time period is a slot, a symbol period, a mini-slot, a plurality of symbol periods, or a combination thereof.

10. The method of claim 1, wherein receiving the first control signaling comprises:
    receiving the first control signaling that indicates to apply the first beam shaping configuration until receiving second control signaling to apply a second beam shaping configuration different from the first beam shaping configuration.

11. The method of claim 1, wherein the first beam shaping configuration indicates one or more settings to adjust an electronic metamaterial of the passive channel engineering device to focus the received signal energy, reflect the received signal energy, refract the received signal energy, filter the received signal energy, or any combination thereof.

12. A method for wireless communications at a network entity, comprising:
    transmitting first control signaling that indicates a plurality of beam shaping configurations for a passive channel engineering device to perform beam shaping and deflection of signals transmitted from the network entity to a respective plurality of user equipment, wherein the first control signaling indicates a plurality of time periods associated with the passive channel engineering device deflecting and beam shaping the signals in a plurality of directions of the respective plurality of user equipment; and transmitting a signal to the passive channel engineering device during a first time period of the plurality of time periods, the first time period associated with a first beam shaping configuration of the plurality of beam shaping configurations, based at least in part on the first control signaling.

13. The method of claim 12, further comprising:
transmitting second control signaling that configures the passive channel engineering device with a respective index of a plurality of indexes corresponding to a respective beam shaping configuration of the plurality of beam shaping configurations.

14. The method of claim 12, wherein
the first control signaling indicates the first time period in which to apply the first beam shaping configuration and a second time period in which to apply a second beam shaping configuration that is different from the first beam shaping configuration.

15. The method of claim 12, wherein transmitting the first control signaling comprises:
transmitting the first control signaling that indicates a second beam shaping configuration different from the first beam shaping configuration; and
transmitting, to the passive channel engineering device, a switching command indicating to switch between the first beam shaping configuration and the second beam shaping configuration.

16. The method of claim 12, wherein receiving the first control signaling comprises:
updating a list of one or more beam shaping settings corresponding to the first beam shaping configuration; and
transmitting, to the passive channel engineering device, the first control signaling that indicates the list of one or more beam shaping settings.

17. The method of claim 12, further comprising:
transmitting the first control signaling prior to a time period boundary between adjacent time periods, the time period boundary preceding a time period in which the first beam shaping configuration is to be applied.

18. The method of claim 17, wherein the time period is a slot, a symbol period, a mini-slot, a plurality of symbol periods, or a combination thereof.

19. The method of claim 12, wherein transmitting the first control signaling comprises:
transmitting the first control signaling that indicates to apply the first beam shaping configuration until receiving second control signaling to apply a second beam shaping configuration different from the first beam shaping configuration.

20. The method of claim 12, wherein the first beam shaping configuration indicates one or more settings to adjust an electronic metamaterial of the passive channel engineering device to focus received signal energy, reflect the received signal energy, refract the received signal energy, filter the received signal energy, or any combination thereof.

21. An apparatus for wireless communications at a passive channel engineering device, comprising:
one or more memories storing processor-executable code; and
one or more processors coupled with the one or more memories and operable to execute the code to cause the one or more processors to:
receive, from a network entity, first control signaling that indicates a plurality of beam shaping configurations for the passive channel engineering device to perform beam shaping and deflection of signals transmitted from the network entity to a respective plurality of user equipment, wherein the first control signaling indicates a plurality of time periods associated with the passive channel engineering device deflecting and beam shaping the signals in a plurality of directions of the respective plurality of user equipment; and
configure the passive channel engineering device to beam shape and deflect received signal energy in a first direction of a user equipment of the respective plurality of user equipment in accordance with a first beam shaping configuration of the plurality of beam shaping configurations during a first time period of the plurality of time periods.

22. The apparatus of claim 21, further comprising a receiver, wherein the one or more processors are operable to execute the code to cause the one or more processors to:
receive, via the receiver, second control signaling that configures the passive channel engineering device with a respective index of a plurality of indexes corresponding to a respective beam shaping configuration of the plurality of beam shaping configurations.

23. The apparatus of claim 21, wherein the first time period of the plurality of time periods is associated with the first beam shaping configuration.

24. The apparatus of claim 21, wherein, to receive the first control signaling, the one or more processors are operable to execute the code to:
apply the first beam shaping configuration of the plurality of beam shaping configurations during the first time period of the plurality of time periods based at least in part on the first control signaling.

25. The apparatus of claim 21, wherein, to receive the first control signaling, the one or more processors are operable to execute the code to:
receive the first control signaling that indicates a second beam shaping configuration different from the first beam shaping configuration; and
receive a switching command indicating to switch between the first beam shaping configuration and the second beam shaping configuration.

26. The apparatus of claim 21, wherein, to receive the first control signaling, the one or more processors are operable to execute the code to:
receive the first control signaling that indicates the first beam shaping configuration comprising a list of one or more beam shaping settings.

27. The apparatus of claim 21, wherein the one or more processors are operable to execute the code to:
receive the first control signaling prior to a time period boundary between adjacent time periods, the time period boundary preceding a time period in which the first beam shaping configuration is to be applied.

28. An apparatus for wireless communications at a network entity, comprising:
one or more memories storing processor-executable code; and
one or more processors coupled with the one or more memories and operable to execute the code to cause the one or more processors to:

transmit first control signaling that indicates a plurality of beam shaping configurations for a passive channel engineering device to perform beam shaping and deflection of signals transmitted from the network entity to a respective plurality of user equipment, wherein the first control signaling indicates a plurality of time periods associated with the passive channel engineering device deflecting and beam shaping the signals in a plurality of directions of the respective plurality of user equipment; and transmit a signal to the passive channel engineering device during a first time period of the plurality of time periods, the first time period associated with a first beam shaping configuration of the plurality of beam shaping configurations, based at least in part on the first control signaling.

* * * * *